United States Patent
Gauthier

(10) Patent No.: US 9,296,297 B2
(45) Date of Patent: Mar. 29, 2016

(54) DUAL STAGE ACCELERATOR ASSEMBLY WITH SELECTABLE STROKE TRANSITION AND PEDAL FEEDBACK SYSTEM

(71) Applicant: Atieva, Inc., Redwood City, CA (US)

(72) Inventor: Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 61 days.

(21) Appl. No.: 14/242,515

(22) Filed: Apr. 1, 2014

(65) Prior Publication Data

US 2015/0277477 A1    Oct. 1, 2015

Related U.S. Application Data

(63) Continuation of application No. 14/231,811, filed on Apr. 1, 2014.

(51) Int. Cl.

| | |
|---|---|
| G05G 1/40 | (2008.04) |
| B60K 26/02 | (2006.01) |
| G05G 7/04 | (2006.01) |
| B60L 11/12 | (2006.01) |
| B60L 11/14 | (2006.01) |
| G05G 1/30 | (2008.04) |
| G05G 25/00 | (2006.01) |
| B60L 7/18 | (2006.01) |
| B60W 50/16 | (2012.01) |
| G05G 1/38 | (2008.04) |
| G05G 5/03 | (2008.04) |
| B60L 11/18 | (2006.01) |

(52) U.S. Cl.
CPC ............. B60K 26/021 (2013.01); B60L 7/18 (2013.01); B60L 11/123 (2013.01); B60L 11/14 (2013.01); B60L 11/1861 (2013.01); B60W 50/16 (2013.01); G05G 1/30 (2013.01); G05G 1/38 (2013.01); G05G 1/40 (2013.01); G05G 5/03 (2013.01); G05G 7/04 (2013.01); G05G 25/00 (2013.01); B60K 2026/022 (2013.01); B60K 2026/023 (2013.01); B60K 2026/025 (2013.01); B60W 2510/244 (2013.01); Y10T 74/2054 (2015.01); Y10T 74/20189 (2015.01); Y10T 74/20534 (2015.01); Y10T 74/20888 (2015.01)

(58) Field of Classification Search
CPC .................................................... G60G 1/30
USPC ............................................. 74/512–514, 560
See application file for complete search history.

(56) References Cited

U.S. PATENT DOCUMENTS

| | | | |
|---|---|---|---|
| 4,510,906 A | 4/1985 | Klatt | |
| 7,715,969 B2 * | 5/2010 | Yamamura | ..................... 701/70 |
| 7,796,578 B2 * | 9/2010 | Stafford | ..................... 370/351 |

(Continued)

*Primary Examiner* — Brodie Follman
*Assistant Examiner* — James Triggs
(74) *Attorney, Agent, or Firm* — Patent Law Office of David G. Beck

(57) ABSTRACT

A dual stage accelerator pedal spring assembly is provided that allows the transition point between stroke stages to be set, thereby controlling pedal travel within the first stroke stage, and notifies the driver of a critical operating condition, such as a low battery pack level, via a pedal feedback system. The spring assembly, which uses two springs exhibiting different spring force, allows adjustment of the relative positions of the two springs in order to control the transition point between the first and second pedal stroke stages. The change in pedal resistance used to notify the driver of a change in a monitored vehicle characteristic is achieved by preloading one of the springs in the spring assembly.

28 Claims, 17 Drawing Sheets

(56) References Cited

U.S. PATENT DOCUMENTS

| | | |
|---|---|---|
| 7,798,578 B2 | 9/2010 | Lewis et al. |
| 2004/0259687 A1 | 12/2004 | Ritter et al. |
| 2007/0240534 A1* | 10/2007 | Makino .......................... 74/513 |
| 2009/0112382 A1 | 4/2009 | Treharne et al. |
| 2012/0060638 A1* | 3/2012 | Saito et al. ....................... 74/513 |
| 2012/0078467 A1 | 3/2012 | Schweikl et al. |
| 2012/0078496 A1 | 3/2012 | Lindhuber et al. |
| 2012/0297920 A1 | 11/2012 | Saito et al. |
| 2013/0066508 A1 | 3/2013 | Ueno et al. |
| 2014/0142807 A1 | 5/2014 | Min et al. |
| 2014/0316648 A1 | 10/2014 | Min |

\* cited by examiner

DUAL STAGE ACCELERATOR ASSEMBLY WITH SELECTABLE STROKE TRANSITION AND PEDAL FEEDBACK SYSTEM

CROSS-REFERENCE TO RELATED APPLICATION

This application is a continuation of U.S. patent application Ser. No. 14/231,811, filed 1 Apr. 2014, the disclosure of which is incorporated herein by reference for any and all purposes.

FIELD OF THE INVENTION

The present invention relates generally to a vehicle and, more particularly, to the design and configuration of an accelerator pedal mechanism that provides the user with feedback relating to vehicle operating conditions.

BACKGROUND OF THE INVENTION

In a conventional vehicle utilizing an internal combustion engine (ICE), the functioning of the accelerator pedal is quite straightforward. Specifically, and assuming a level road surface, when the user presses down on the accelerator pedal the car accelerators; when the user maintains the accelerator pedal in a particular location the car speed remains steady; and when the user releases pressure on the accelerator pedal the car decelerates, the rate of deceleration depending on whether or not the engine is in gear.

In typical hybrid and electric vehicles, when the user applies pressure to the brake pedal a regeneration system generates electricity that is used to recharge the vehicle's battery pack. Additionally in some electric vehicles, both hybrid and all-electric vehicles, when the user either completely releases pressure from the accelerator or simply reduces the force applied to the accelerator indicating the driver's desire to decelerate, the vehicle is configured to apply regenerative braking, thereby helping to recapture energy and partially recharge the battery pack while slowing the car. Some drivers, however, find it unnerving for the regeneration system to be applied while they still have their foot on the accelerator pedal, especially if the regeneration system is applied aggressively. At least in part, this reaction may be due to the differences felt by the driver when regenerative braking is applied versus the deceleration of a conventional, ICE-based vehicle.

Accordingly, what is needed is an accelerator pedal mechanism that helps alleviate the discomfort felt by some drivers during deceleration of an EV, preferably while providing useful feedback to the driver. The present invention provides such an accelerator pedal mechanism.

SUMMARY OF THE INVENTION

The present invention provides a dual stage accelerator assembly that allows the transition point between stroke stages to be set, thereby controlling pedal travel within the first stroke stage, and notifies the driver of critical operating conditions via a pedal feedback system. The system is comprised of an accelerator pedal and a first spring assembly coupled to the accelerator pedal by an accelerator linkage arm. The first spring assembly is comprised of (i) a first spring, (ii) a second spring assembly that includes a second spring and a rear second spring assembly support member proximate to the second end of the second spring, where the position of the second spring assembly relative to the first spring determines the transition point between the first and second pedal stroke stages, (iii) a spring compression member coupled to the linkage arm and proximate to the first end of the first spring, where during the initial stage of accelerator pedal travel corresponding to the first pedal stroke stage the spring compression member only compresses the first spring, and where during the final stage of accelerator pedal travel corresponding to the second pedal stroke stage the spring compression member compresses both the first spring and the second spring, (iv) a rear spring support member proximate to the second end of the first spring, where the rear spring support member may be positioned in at least a first position and a second position, where the support member in the second position increases the preload compression applied to the first spring compared to the first position, and where the support member in the second position increases accelerator pedal resistance compared to the first position, (v) a first adjustment mechanism coupled to the rear spring support member which moves the support member to the first position upon receipt of a first control signal and moves the support member to the second position upon receipt of a second control signal, which moves the second spring assembly to a first position relative to the first spring upon receipt of a first control signal and moves the second spring assembly to a second position relative to the first spring upon receipt of a second control signal, (vi) a preload adjustment controller configured to transmit the first and second control signals to the first adjustment mechanism, (vii) a second adjustment mechanism coupled to the rear second spring assembly support member which moves the second spring assembly to a first position relative to the first spring upon receipt of a third control signal and moves the second spring assembly to a second position relative to the first spring upon receipt of a fourth control signal, where the first pedal stroke stage is shorter when the second spring assembly is in the second position compared to the first position, and (viii) a stage transition controller configured to transmit the third and fourth control signals to the second adjustment mechanism. The first spring and the second spring may each be comprised of a compression coil spring. The first spring may be a compression coil spring and sized to allow the second spring assembly to be contained within the first spring. Preferably the spring force associated with the first spring is less than the spring force associated with the second spring. Preferably the first spring is longer than the second spring. The second spring assembly may include a spring guide configured to guide the second spring during the second pedal stroke stage. A secondary spring compression member may be interposed between the first spring compression member and the second spring, such that during the first pedal stroke stage the first compression member moves and the second spring compression member remains stationary, and such that during the second pedal stroke stage both the first and second compression members move. One or more positioning members of a first type may couple the first adjustment mechanism to the first rear spring support member, and one or more positioning members of a second type may couple the second adjustment mechanism to the rear second spring assembly support member. The first and/or the second adjustment mechanism may be comprised of an electro-mechanical system (e.g., an electric motor) or a pneumatic positioning system. The third and fourth control signals may be input into the stage transition controller via a user interface coupled to the stage transition controller.

In one aspect of the invention, the system may further comprise (i) a regeneration system coupled to the vehicle's battery pack and configured to recharge the battery pack when activated, (ii) a pedal stroke sensor which monitors accelerator pedal travel and detects an initial stage of accelerator pedal travel corresponding to the first pedal stroke stage and detects a final stage of accelerator pedal travel corresponding to the second pedal stroke stage, and (iii) a regeneration system controller coupled to the pedal stroke sensor and to the regeneration system, where the regeneration system controller is configured to activate the regeneration system during the first pedal stroke stage and deactivate the regeneration system during the second pedal stroke stage. Preferably during the second pedal stroke stage the vehicle battery pack is electrically coupled to the vehicle's propulsion motor. The regeneration system controller may be configured to deactivate the regeneration system after completion of the first pedal stroke stage and prior to initiation of the second pedal stroke stage. The regeneration system controller may be coupled to the preload adjustment controller, where the regeneration system controller monitors at least one characteristic of the regeneration system, where the preload adjustment controller transmits the first control signal to the first adjustment mechanism when the monitored characteristic is within a preset range, and where the preload adjustment controller transmits the second control signal to the first adjustment mechanism when the monitored characteristic is outside of the preset range. The preset range may be input by the vehicle manufacturer or input via a user interface coupled to the preload adjustment controller.

In another aspect, the system may further include a battery management system coupled to the vehicle's battery pack and to the preload adjustment controller, where the battery management system monitors at least one characteristic of the battery pack. Monitored characteristics may include current battery pack capacity and/or available driving range based on current battery pack capacity. The preload adjustment controller may be configured to transmit the first control signal to the first adjustment mechanism when the monitored characteristic is within a preset range, and the second control signal to the first adjustment mechanism when the monitored characteristic is outside of the preset range. The preset range may be input by the vehicle manufacturer or input via a user interface coupled to the preload adjustment controller.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure. The term "battery pack" as used herein refers to one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Figure 1:
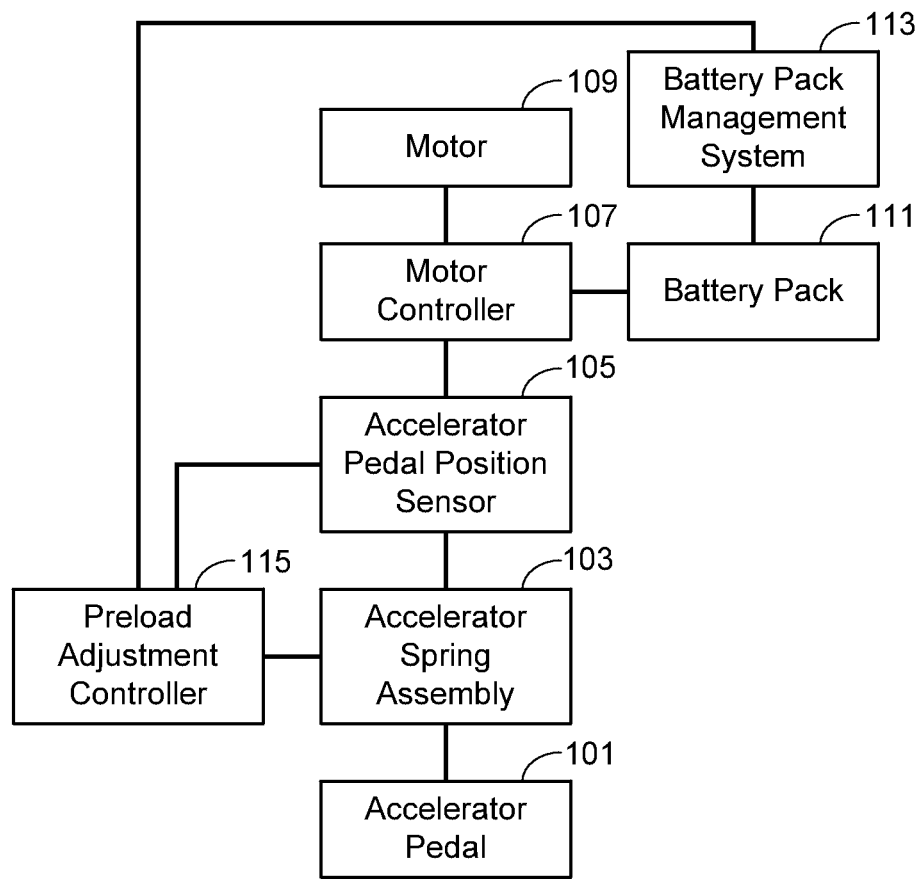
FIG. 1 provides a block diagram of the primary components, assemblies and subsystems used in at least one embodiment of the invention.
Figure 2:
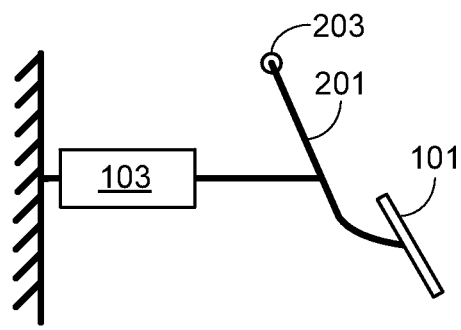
FIG. 2 illustrates the relationship of the accelerator spring assembly to the pedal in one embodiment of the invention.

FIG. 1 provides a block diagram of the primary components, assemblies and subsystems used in at least one embodiment of the invention. As shown, attached to accelerator pedal 101 is the accelerator spring assembly 103. It should be understood that the term "spring" as used herein may refer to any of a variety of mechanisms that can be used to provide resistance to the depression of pedal 101, although in the preferred embodiment the spring is a mechanical spring, more preferably a compression spring, and still more preferably a coiled compression spring. FIG. 2 illustrates the relationship of accelerator spring assembly 103 to pedal 101 in one embodiment of the invention in which the pedal bracket 201 is hinged about hinge point 203.

As the driver depresses accelerator pedal 101, the degree to which the pedal is depressed is monitored by a sensor 105. Although sensor 105 is preferably integrated into spring assembly 103, it may also be separate from assembly 103, for example coupled via a linkage arm to the bracket 201 to which pedal 101 is mounted. The position of pedal 101, as detected by sensor 105, is used by a motor control subsystem 107 to control the speed of motor 109, and thus the speed of the vehicle. The power required to operate motor 109 is provided by the battery or batteries within battery pack 111.

In a typical EV, a variety of battery pack characteristics are periodically or continually monitored using a set of appropriate sensors, thus allowing the battery pack management system 113 to determine the health of the battery pack as well as optimize battery pack operation. Some of the characteristics that may be monitored include state-of-charge, temperature (both battery pack internal temperature and individual battery temperature), current battery pack capacity, rate of charge, rate of discharge, number of charge cycles to date, battery pack pressure, battery pack humidity level, short circuits, open circuits, etc. Of these, the current battery pack capacity is of primary importance in determining how much further the car can travel before the battery is drained. The rate of discharge, which varies with road slope, ambient temperature, battery age, rate of acceleration and in general how hard the car is being driven, is another important battery pack characteristic as the EV's remaining range will vary both with current battery pack capacity and the rate of discharge (e.g., current rate of discharge, average rate of discharge, etc.).

Due to the importance of the current battery capacity in determining available driving range, a typical EV will provide several indicators of the current battery pack capacity and, in some instances, combine that information in a display with the remaining vehicle range. Typical displays provide some graphical representation of current battery pack capacity and/or remaining vehicle range; alternately, these values may be provided digitally, for example by providing the percentage of the remaining battery pack capacity and/or the remaining vehicle range given in terms of the number of miles or kilometers the car can still travel for a given rate of discharge. Given the importance of this data along with the range anxiety felt by some EV drivers, this data is often color coded to emphasize dwindling battery capacity and/or available driving range. For example, from 50 to 100 percent capacity the data may be color coded blue; then from 25 to 50 percent capacity the data may be color coded yellow; and lastly from 0 to 25 percent capacity the data may be color coded red.

While visual displays provide the driver with the necessary information to schedule charging cycles and tailor driving habits to match available battery capacity, such displays often lead to increased, rather than decreased, range anxiety as the driver focuses on the displayed data. Alternately, the driver may ignore the displayed information until they are out of range of their preferred charging station. Accordingly the preferred embodiment of the present invention can be used to provide the user with a tactile indicator that the battery capacity has fallen below a preset level.

Figure 3:
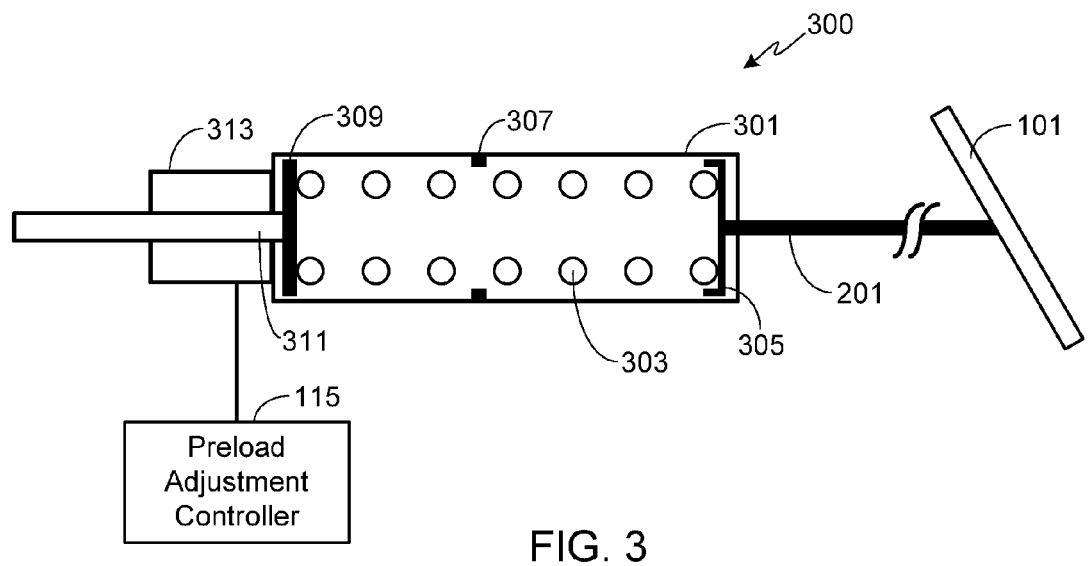
FIG. 3 provides a cross-sectional view of an accelerator spring assembly in accordance with a preferred embodiment.

FIG. 3 illustrates a preferred embodiment of an accelerator spring assembly 300 in accordance with the invention. Within spring housing 301 is a spring 303, where spring 303 is preferably comprised of a compression coil spring as shown. The accelerator pedal arm 201, attached at one end to pedal 101, passes into spring housing 301. A portion of pedal arm 105, distal from pedal 101, is coupled to a spring compression member 305 such that as pedal 101 is depressed by the driver, spring 303 is compressed within spring housing 301. As a result, the further the driver depresses pedal 101, the greater the force required to overcome the force provided by spring 303. Although not required, preferably spring housing 301 includes a pedal stop 307 that limits the possible travel of spring compression member 305, thereby limiting how far pedal 101 may be depressed.

The front face of spring 303 rests against spring compression member 305 while the rear face of spring 303 rests against a rear spring support member 309. The position of support member 309 within spring housing 301 is adjustable, at least between a first position and a second position, and preferably over a range of positions. In the illustrated embodiment, support member 309 is coupled to at least one positioning rod 311. The location of the positioning rod(s) 311, and therefore the location of support member 309, is controlled by adjustment mechanism 313. Adjustment mechanism 313 is preferably an electro-mechanical system, for example an electric motor using means such as a set of gears (e.g., a worm gear) to control the position of positioning rod(s) 311. Alternately, mechanism 313 may be a pneumatic positioning system or other positioning system. It should be understood that the invention is not limited to a specific adjustment mechanism; rather, the system merely requires a means of controllably positioning spring support member 309.

Figure 4:
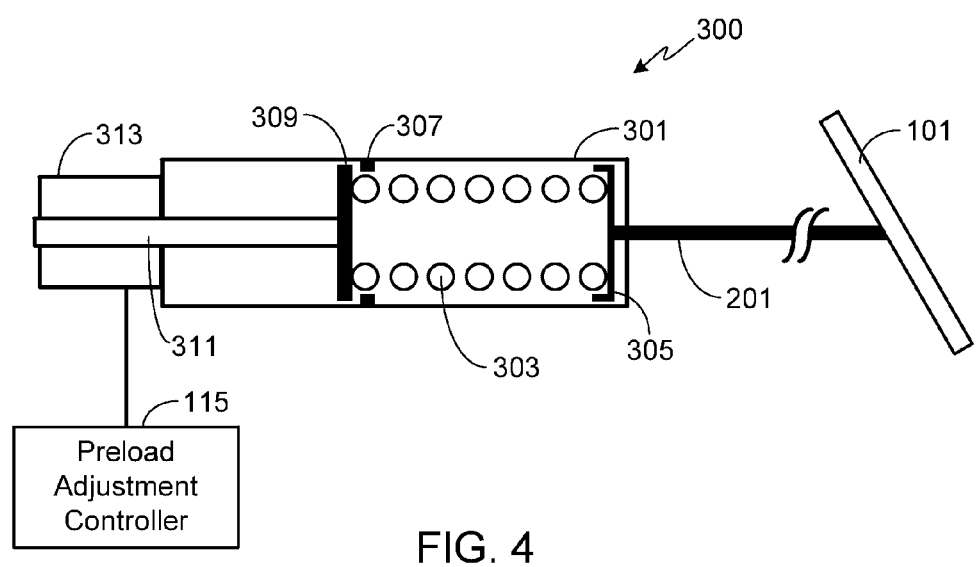
FIG. 4 illustrates the same accelerator spring assembly shown in FIG. 3 after the spring has been preloaded.

The location of rear spring support member 309 determines the force applied by the spring to spring compression member 305, and thus the resistance encountered by the driver as they attempt to depress accelerator pedal 101. In accordance with the invention, when a preselected battery pack characteristic associated with battery pack 111 and monitored by battery pack management system 113 reaches a predetermined level, the spring preload adjustment controller 115 adjusts the position of rear spring support member 309 using mechanism 313. For example, when the preselected battery pack characteristic reaches the predetermined level, controller 115 changes the position of support member 309 from that shown in FIG. 3 to the position shown in FIG. 4 in which spring 303 is preloaded, i.e., partially compressed. Compression of spring 303 by the rear spring support member 309 immediately increases the force applied by the spring to accelerator pedal 101, thereby instantly alerting the driver, via the change in pedal force, to the change in the monitored battery characteristic. Thus if the monitored battery pack characteristic is battery pack capacity, and the preload controller 115 is set to preload spring 303 when the battery pack capacity falls below 15 percent, then the driver is immediately alerted to the fact that the battery pack capacity has fallen to a critically low level and that battery charging will be required soon. The driver is then able to vary their route and/or their driving characteristics (e.g., acceleration rate, top speed, applying power versus coasting, etc.) in order to insure that they reach their destination prior to the battery becoming completely drained. Note that once alerted, preferably the driver is able to verify battery pack conditions by using the vehicle's gauges and displays that provide critical vehicle parameters such as current battery pack capacity.

It will be appreciated that while battery pack capacity is the preferred battery pack characteristic that is monitored and used by the preload controller 115 to adjust the compression characteristics of spring 303 using rear spring support member 309, other battery pack characteristics may also be used. For example, in order to make the monitored parameter more easily understood by the driver, the battery pack capacity may be modified by the average discharge rate (or the current discharge rate) and the vehicle's efficiency to yield a current available driving range, i.e., the driving range that can be achieved before the battery pack is completely drained. Thus rather than preloading spring 303 when the battery pack reaches a preset capacity, e.g., 15 percent capacity, the spring may be preloaded when the current driving range reaches a preset range, e.g., 20 miles, thereby providing the driver with a characteristic that they may feel more comfortable with than the battery capacity. In such a scenario, once the driver experiences an abrupt change in pedal force they would immediately know that they are limited to a driving range of approximately 20 miles (or other preset range), the exact range depending upon driving conditions (e.g., speed, flat roads versus hills, ambient temperature, battery age, etc.).

Figure 5:
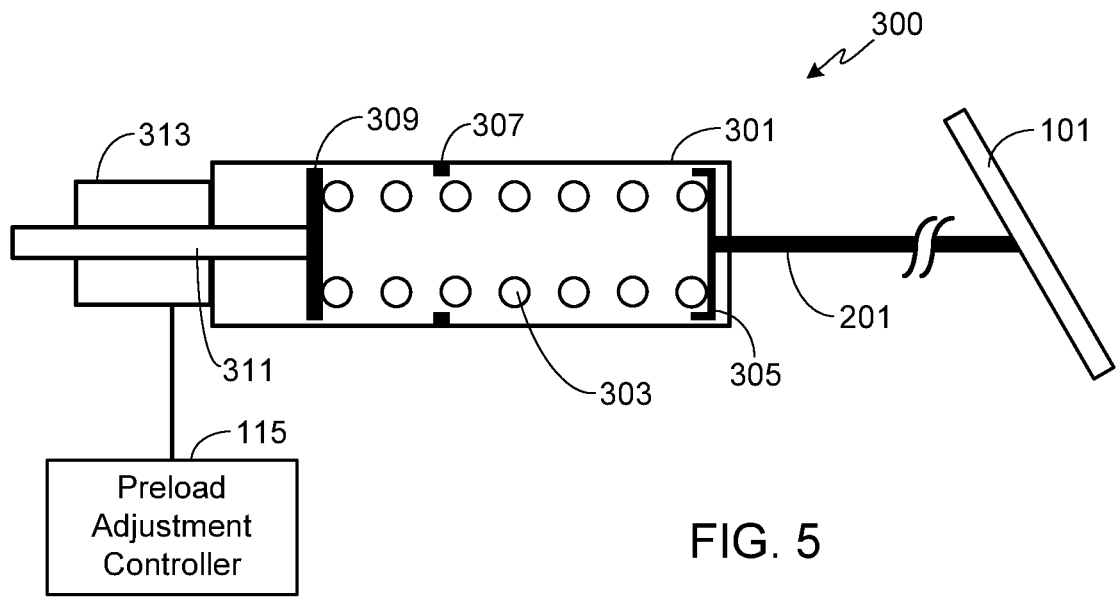
FIG. 5 illustrates the same accelerator spring assembly shown in FIGS. 3 and 4 with the spring preloaded to an intermediate level.

In a modification of the embodiment described above, rather than alter the spring characteristics between two conditions, unloaded and preloaded, the preload adjustment controller 115 is configured to preload spring 303 to several different levels based on battery pack capacity or an alternate battery pack characteristic. For example, controller 115 may preload the spring 303 to a first level when the battery pack capacity falls to 25 percent, and to a second level when the battery pack capacity falls to 10 percent. FIG. 5 illustrates spring assembly 300 with the rear spring support member 309 positioned in an intermediate location between the unloaded state shown in FIG. 3 and the fully preloaded state shown in FIG. 4. This approach allows the user to receive one or more warnings before the final, critical warning. Preferably in order to insure that the driver notices the change in pedal force, the spring preloading is sufficient at each state that the driver is immediately aware of the change.

Figure 6:
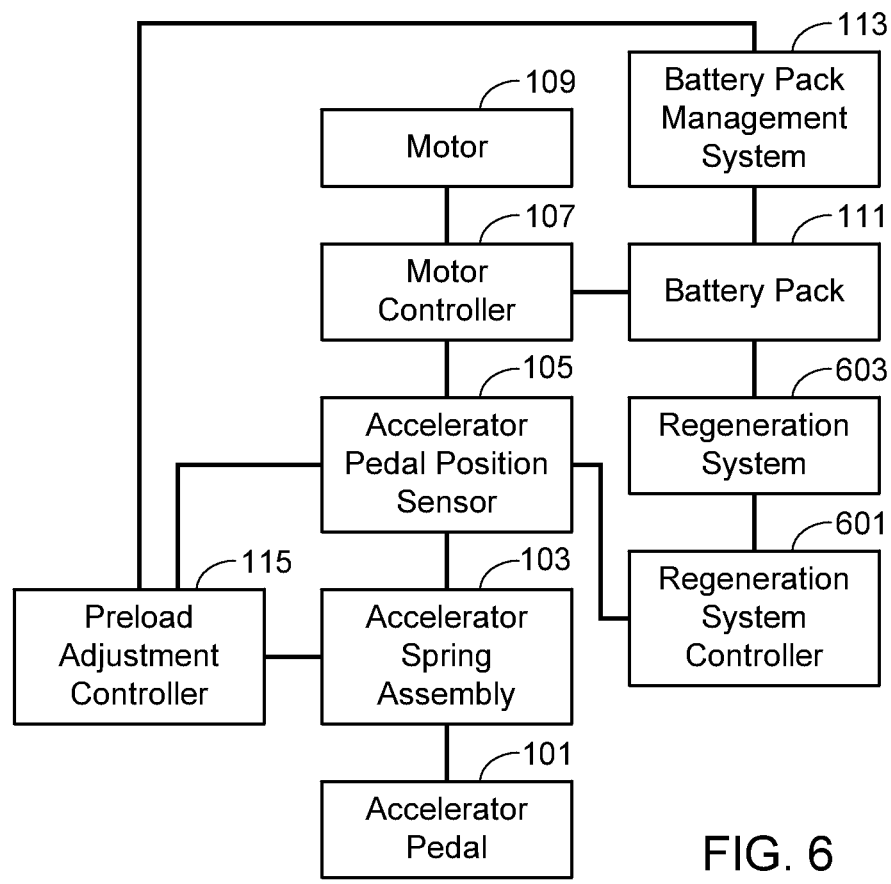
FIG. 6 provides a block diagram of the primary components, assemblies and subsystems as shown in FIG. 1, modified to include a regeneration system.

As noted above, in many EVs the regeneration system is configured to operate when the driver reduces and/or releases pressure from the accelerator pedal, and before the driver applies pressure to the brake pedal. It should be understood that the inclusion of regeneration prior to pressure being applied to the brake pedal does not impact the use of the embodiment. In such a configuration and as illustrated in FIG. 6, the regeneration system controller 601 would then monitor a vehicle condition, e.g., position of pedal 101, pressure applied to pedal 101, direction of pedal 101 motion, or other condition, and apply the regeneration system 603 whenever the appropriate conditions are met, e.g., during deceleration, when pressure is released from pedal 101, etc. Since the application of the regeneration system does not affect performance of the previous embodiment, and as regeneration systems are well known by those of skill in the art, further discussion is not provided herein.

In a modification of the embodiment described above, rather than preloading spring 303 based on a monitored battery characteristic, preloading is used to distinguish between the regeneration and power stages of the pedal stroke. In this configuration, when the pedal position sensor 105 reaches a preselected position corresponding to a preset amount of pedal travel, the system is configured to switch between recharging battery pack 111 using regeneration system 603 and applying power to motor 109. In order to indicate to the driver this change in operation, controller 115 is configured to preload spring 303 at the transition point between stroke stages. Accordingly, when the car is at rest and the driver first depresses pedal 101, the motion of pedal 101 is relatively easy as the only resistance is provided by spring 303 with no preloading. During this stage of pedal motion, motor controller 107 does not supply power to motor 109 and, since the car is not yet moving, the regeneration system 603 does not generate power to recharge battery pack 111. Once pedal position sensor 105 detects that the pedal has reached the transition point between stroke stages, controller 115 is configured to preload spring 303 by adjusting the position of rear spring support member 309. After the transition point, as the driver continues to apply pressure to pedal 101 they will sense a change in pedal resistance as a result of the preloading of spring 303. Throughout the second stroke stage, regardless of whether the driver is depressing or partially releasing pedal 101, motor controller 107 supplies power to motor 109 and controller 115 continues to preload spring 303. During deceleration and as the driver releases pressure from pedal 101, once pedal position sensor 105 detects that the pedal has reached the transition point, controller 115 returns the rear support member 309 to the non-preloaded position, allowing the driver to sense the change in pedal stroke by noting the difference in pedal resistance. During this stage and with spring preloading deactivated, the regeneration system controller 601 actively recharges battery pack 111 using regeneration system 603. After the driver releases all pressure from pedal 101, the system can be configured to either stop or continue recharging battery pack 111 for as long as the car is still moving.

Preferably the preset or presets used by the preload adjustment controller 115 to determine when to preload the spring assembly are input by the vehicle manufacturer. Alternatively, the system can be configured to allow a third party, such as a service technician, input or adjust the preload presets. Alternately, the system can be configured to allow the end user to input or adjust the preload presets. Allowing the end user to input or adjust the preload presets permits a more risk adverse driver, for example a new EV owner, to set-up the preload preset to a relatively high battery pack capacity (or similar characteristic) while permitting a less risk adverse driver, for example an experienced EV owner or an EV owner that has easy access to multiple charging stations throughout their driving area, to use a preload preset set at a relatively low battery pack capacity (or similar characteristic). Allowing the end user to set the preload presets is also more convenient when the vehicle is used by multiple drivers, for example the members of a family. An end user may also wish to change the preload preset before using the vehicle for vacation travel in an unknown area where charging station location and access is unknown.

Figure 7:
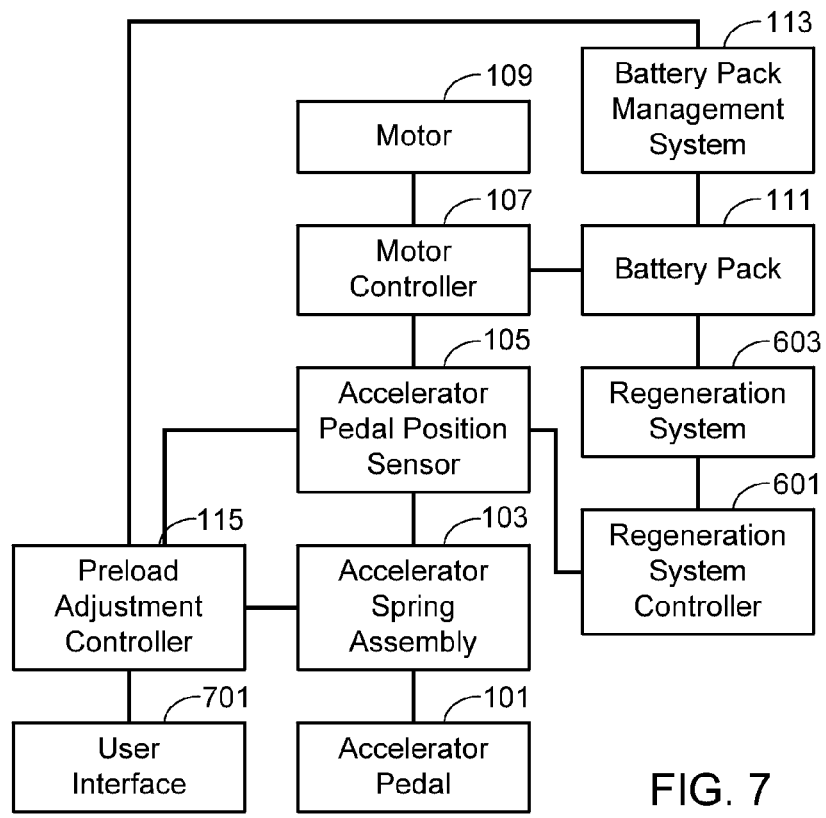
FIG. 7 illustrates the system shown in FIG. 6, modified to include a user interface.

FIG. 7 illustrates the system shown in FIG. 6, modified to include a user interface 701. User interface 701, which is preferably integrated into the vehicle's management system, may use a touch-sensitive display, a non-touch-sensitive display combined with any of a variety of switch types (e.g., toggle switches, push button switches, slide switches, etc.), a stand-alone switch (e.g., slide switch, rotary switch, etc.) with several different presets from which to select, or other means that allow the user to select the desired preload preset. It should be understood that the inclusion of a user interface that allows a user to set the preload preset may also be included in the system shown in FIG. 1, or other systems that utilize the accelerator spring assembly of the invention.

Figure 8:
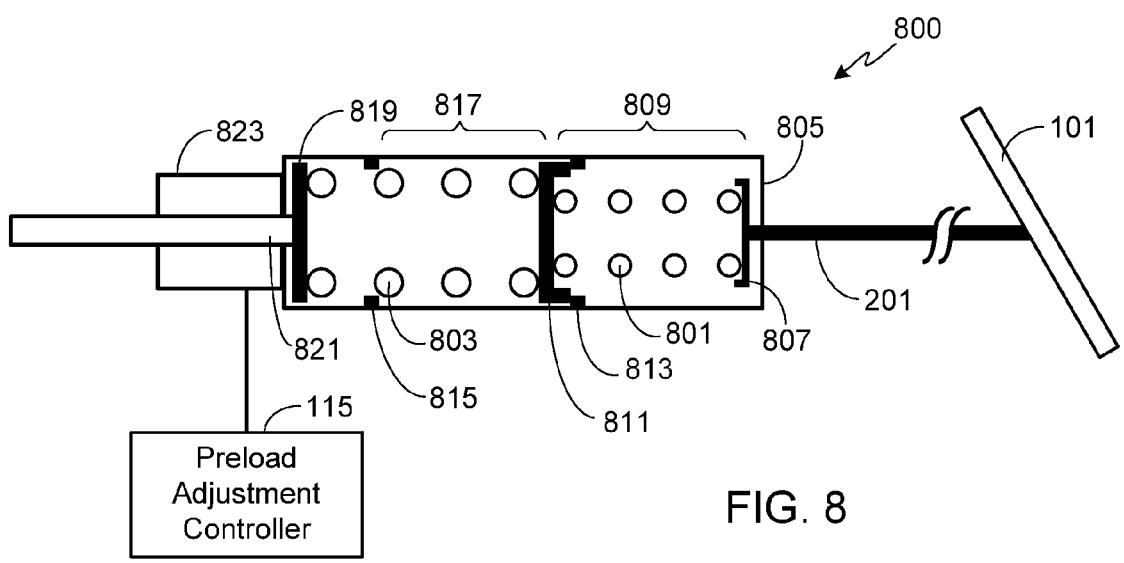
FIG. 8 provides a cross-sectional view of an accelerator spring assembly in accordance with an alternate preferred embodiment.
Figure 9:
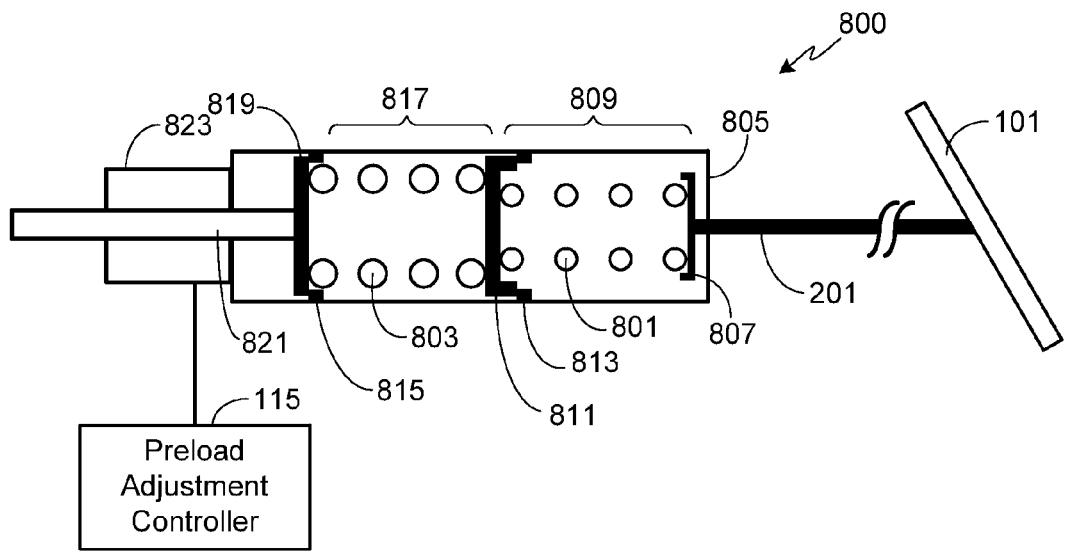
FIG. 9 illustrates the same accelerator spring assembly shown in FIG. 8 after the spring has been preloaded.

FIGS. 8 and 9 illustrate a preferred embodiment of the invention using a dual stage spring assembly 800 in which one of the stages may be preloaded. This embodiment allows the accelerator pedal system to communicate at least two different vehicle operating conditions to the driver, plus notify the driver of a critical operating condition, such as a low battery capacity, via spring preloading.

In dual stage spring assembly 800, two different springs 801 and 803 are contained within spring housing 805. The two springs 801 and 803 exhibit different spring characteristics, specifically different levels of spring force, that are easily distinguishable by the driver as he or she applies pressure to pedal 101. As in the prior embodiment, preferably springs 801 and 803 are each comprised of a compression coil spring as shown, although other types of springs may be used. Accelerator pedal arm 201, attached at one end to pedal 101, passes into spring housing 805 and is coupled to a spring compression member 807, distal from pedal 101.

In the preferred and illustrated embodiment, when the driver initially applies pressure to pedal 101, the weaker spring compresses. In this embodiment the weaker spring is spring 801. If the driver continues to exert pressure on pedal 101 after spring 801 is completely compressed in region 809, or at the point at which the force exerted by spring 801 exceeds the force exerted by spring 803, then secondary spring compression member 811 will begin to compress spring 803. Note that in this embodiment a pair of stops 813 and 815 limit motion of spring compression member 811 to region 817.

In the preferred mode of operation, when the car is at rest and the driver first depresses pedal 101, the motion of pedal 101 is relatively easy as the only resistance is provided by weak spring 801. During this stage of pedal motion, motor controller 107 does not supply power to motor 109 and, since the car is not yet moving, the regeneration system 603 does not generate power to recharge battery pack 111. After spring 801 is fully compressed, as the driver continues to apply pressure to pedal 101 they will sense a change in pedal resistance as a result of strong spring 803. Throughout the compression range 817 of spring 803, regardless of whether the driver is depressing or partially releasing pedal 101, motor controller 107 supplies power to motor 109. During deceleration if the driver continues to release pressure on pedal 101, the driver is able to sense the difference in pedal resistance between regions 817 and 809 of the spring assembly. Once secondary spring compression member 811 reaches stops 813, pedal resistance drops and the regeneration system controller 601 actively recharges battery pack 111 using regeneration system 603 throughout region 809. After the driver releases all pressure from pedal 101, the system can be configured to either stop or continue recharging battery pack 111 for as long as the car is still moving.

In at least one embodiment of the invention, when spring 801 is fully compressed and the secondary spring compression member 811 is at rest on stops 813, i.e., when the spring assembly is between ranges 809 and 817, the car coasts. Thus the present invention allows a third mode of operation, i.e., coasting, to be easily sensed, and thus controlled, by the driver. Coasting allows the driver to extend the distance the car travels for a given amount of energy stored within battery pack 111. It will be appreciated that in some situations coasting may be preferred while in other situations, for example when the battery pack has a low charge level, charging via the regeneration system may be preferred.

The front face of spring 803 rests against secondary spring compression member 811 while the rear face of spring 803 rests against a rear spring support member 819. The position of support member 819 within spring housing 805 is adjustable, at least between a first position (see FIG. 8) and a second position (see FIG. 9), and in some applications over a range of positions as described above relative to the embodiment shown in FIG. 5. In the embodiment shown in FIGS. 8 and 9, support member 819 is coupled to at least one positioning rod 821. The location of the positioning rod(s) 821, and therefore the location of support member 819, is controlled by adjustment mechanism 823. Adjustment mechanism 823 may be an electro-mechanical system, a pneumatic positioning system or other positioning system. It should be understood that the invention is not limited to a specific adjustment mechanism; rather, the system merely requires a means of controllably positioning spring support member 819.

The location of rear spring support member 819 determines the force applied by spring 803 to the secondary spring compression member 811, and thus the resistance encountered by the driver as they depress accelerator pedal 101 within the second stage 817 of the pedal stroke, e.g., the accelerator portion versus the regeneration portion of the stroke. As in the prior embodiment, when a preselected battery pack characteristic associated with battery pack 111 and monitored by battery pack management system 113 reaches a predetermined level, the spring preload adjustment controller 115 adjusts the position of rear spring support member 819 using mechanism 823, thereby compressing and preloading spring 803. As a result of preloading spring 803, as the driver depresses pedal 101 past the regeneration stage (region 809), or if the pedal stroke has already traveled past the regeneration stage, then the driver will be immediately alerted to the change in the monitored battery pack characteristic (e.g., current battery pack capacity, current available driving range, etc.). Once the driver has been alerted to the fact that the battery pack capacity (or other characteristic) has fallen to a critically low level, appropriate action can be taken such as varying the travel route and/or driving characteristics (e.g., acceleration rate, top speed, applying power versus coasting, etc.). As in the previously described embodiment illustrated in FIGS. 3-5, the preset(s) used to determine when to initiate spring preloading may be set by the vehicle's manufacturer, a third party or even the driver utilizing user interface 701.

Figure 10:
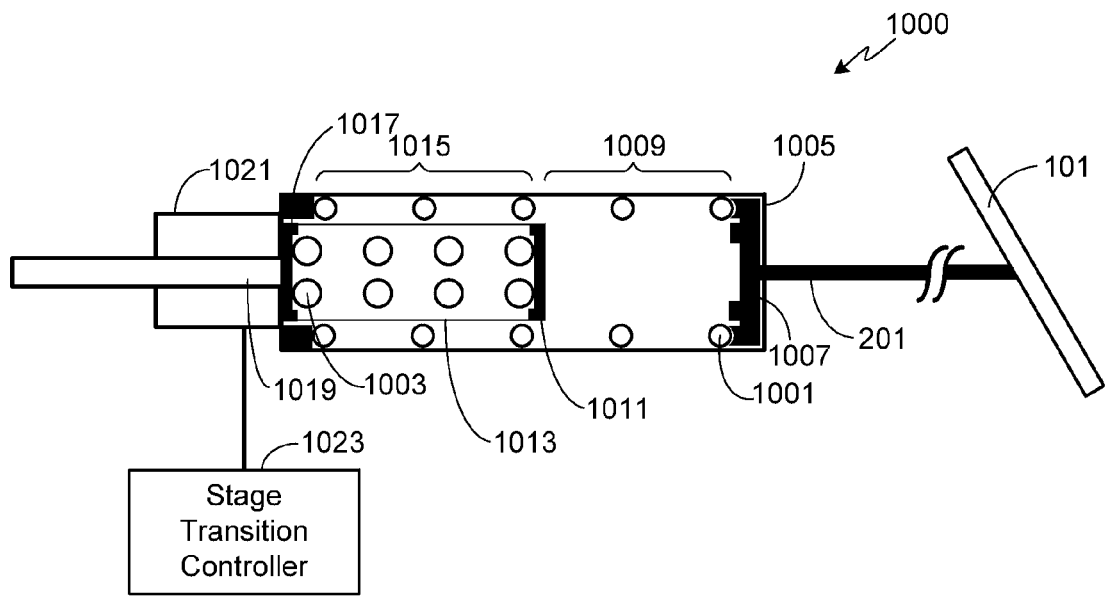
FIG. 10 provides a cross-sectional view of an accelerator spring assembly in accordance with an alternate preferred embodiment.

FIG. 10 illustrates a preferred embodiment of the invention using a dual stage spring assembly 1000 in which the transition point between the two stages may be adjusted. As in the embodiment illustrated in FIGS. 8 and 9, during the first stage of pedal motion regeneration system 603 actively recharges battery pack 111, assuming the vehicle is in motion, while in the second stage of pedal motion power is supplied to motor 109. In at least one configuration of this embodiment, and as described above relative to the previous embodiment, the system allows the car to coast when the pedal is located between the first and second stages.

In dual stage spring assembly 1000, two different springs 1001 and 1003 are contained within spring housing 1005. The two springs 1001 and 1003 exhibit different spring characteristics, specifically different levels of spring force, thereby allowing the driver to distinguish between the first and second stages of pedal motion. As in the prior embodiments, preferably springs 1001 and 1003 are each comprised of a compression coil spring as shown, although other types of springs may be used. Accelerator pedal arm 201, attached at one end to pedal 101, passes into spring housing 1005 and is coupled to a spring compression member 1007, distal from pedal 101.

Figure 11:
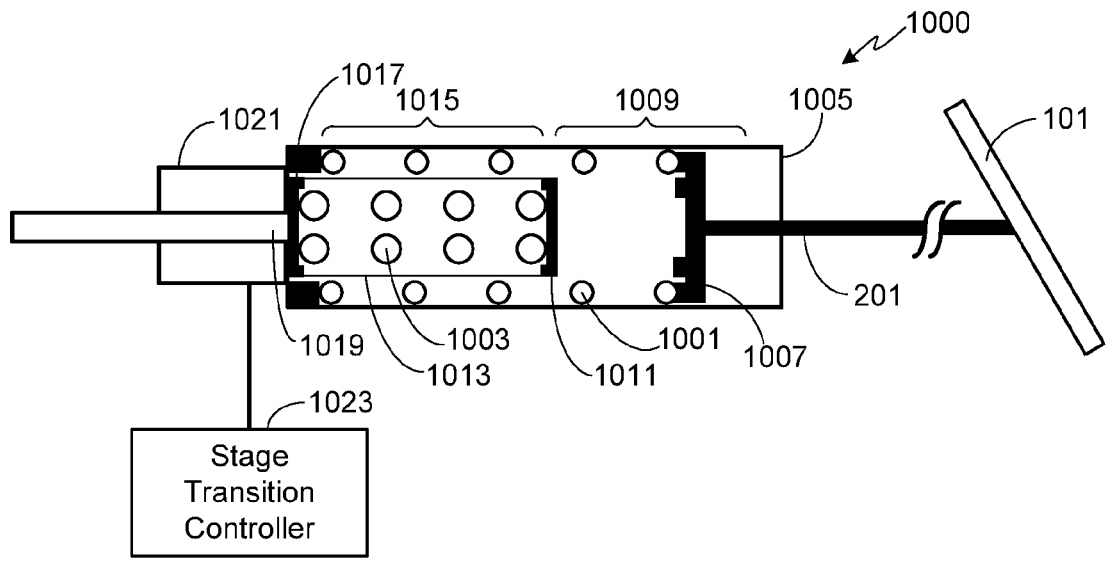
FIG. 11 illustrates the same accelerator spring assembly shown in FIG. 10 during first stage spring compression.
Figure 12:
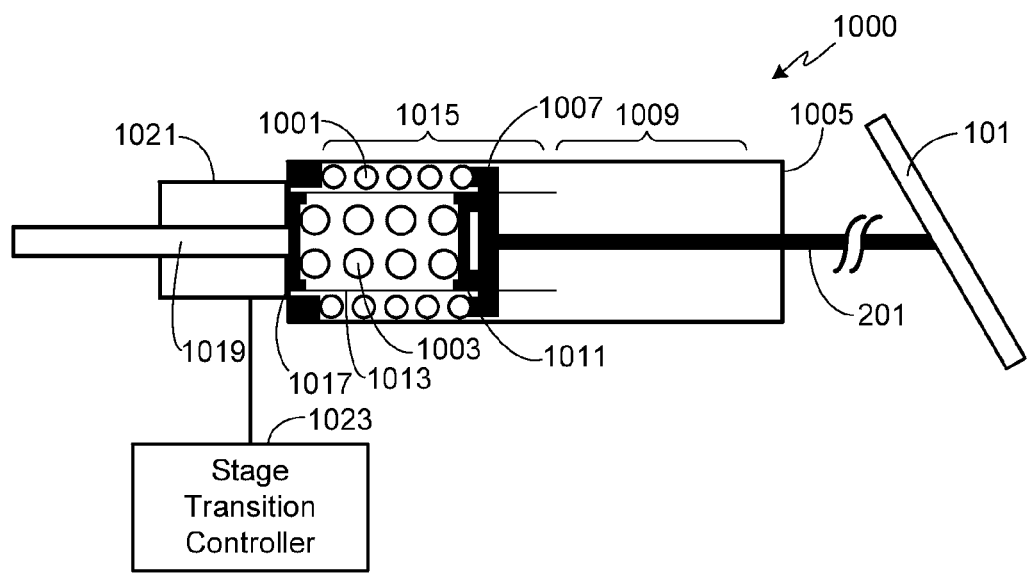
FIG. 12 illustrates the same accelerator spring assembly shown in FIG. 10 during second stage spring compression.

In the preferred and illustrated embodiment, when the driver initially applies pressure to pedal 101, the weaker spring is compressed. FIG. 11 illustrates spring assembly 1000 with a partial depression of pedal 101, causing weaker spring 1001 to be partially compressed by spring compression member 1007. If the driver increases the pressure on pedal 101, thereby further depressing pedal 101, spring 1001 will become completely compressed within region 1009. Further depression of pedal 101 will then cause spring compression member 1007 to compress spring 1003. In the illustrated embodiment, spring compression member 1007 indirectly compresses spring 1003 using secondary spring compression member 1011. Note that a guide 1013 is preferably used to guide secondary spring compression member 1011 and to insure proper placement of spring 1003 within container 1005. FIG. 12 illustrates spring assembly 1000 with pedal 101 sufficiently depressed to cause complete compression of spring 1001 within region 1009 and partial compression of spring 1003 within region 1015.

In the preferred mode of operation, when the car is at rest and the driver first depresses pedal 101, the motion of pedal 101 is relatively easy as the only resistance is provided by weak spring 1001. During this stage of pedal motion, motor controller 107 does not supply power to motor 109 and, since the car is not yet moving, the regeneration system 603 does not generate power to recharge battery pack 111. After spring 1001 is fully compressed, the driver is able to sense the difference in spring force indicative of the change between the first and second stages of pedal operation. If the driver increases the pressure applied to pedal 101 and depresses pedal 101 further, the spring force from the combination of springs 1001 and 1003 will increase pedal resistance. Throughout compression range 1015, regardless of whether the driver is actively depressing or partially releasing pedal 101, motor controller 107 supplies power to motor 109. During deceleration if the driver continues to release pressure on pedal 101, the driver is able to sense the difference in pedal resistance between regions 1015 and 1009 of the spring assembly. After spring compression member 1007 is no longer applying pressure to spring 1003, either directly or indirectly as shown in the preferred embodiment, power is no longer supplied to motor 109 and the regeneration system controller 601 actively recharges battery pack 111 using regeneration system 603. After the driver releases all pressure from pedal 101, the system can be configured to either stop or continue recharging battery pack 111 for as long as the car is still moving.

The embodiment illustrated in FIGS. 10-12 can be configured to provide a third mode of operation, specifically coasting. By applying this mode of operation between stages 1009 and 1015, i.e., once spring 1001 is fully compressed and compression of spring 1003 has not yet begun, the driver is able to easily select between the three modes of operation; power, coasting and regeneration. As previously noted, by foregoing battery recharging via the regeneration system and coasting, the driver is able to extend the distance the car travels for a given amount of energy stored within battery pack 111.

Figure 13:
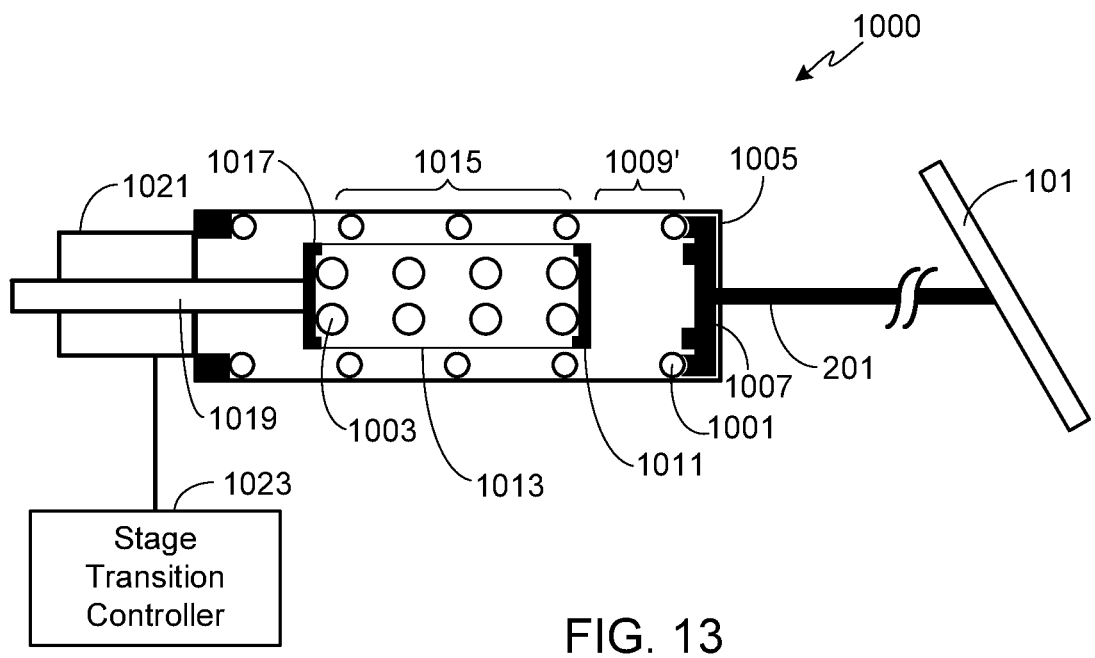
FIG. 13 illustrates the same accelerator spring assembly shown in FIG. 10 after adjustment of the first/second stage transition point.

In the embodiment shown in FIGS. 10-12, the user is able to adjust the point at which the pedal assembly switches between the first stage and the second stage of operation. In particular, the user is able to shorten or lengthen region 1009, and thus the amount of pedal motion associated with the regeneration system. This aspect is illustrated in FIG. 13. As shown, the position of spring 1003 relative to spring compression member 1007 has been changed, reducing the size of region 1009 to new size 1009'. As a result of this change, pedal 101 is only depressed a relatively short distance before the second stage (i.e., spring 1003) is engaged. This aspect of the invention allows further customization of the accelerator pedal motion and thus customization of the driving experience.

Spring assembly 1000 includes a second spring subassembly that includes spring 1003, rear spring support member 1017, spring guide 1013 and the secondary spring compression member 1011, assuming a secondary spring compression member is used as preferred. The position of rear spring support member 1017 and the entire second spring subassembly within spring housing 1005 is adjustable. Rear spring support member 1017, and therefore the entire second spring subassembly, is coupled to at least one positioning rod 1019. The location of the positioning rod(s) 1019, and therefore the location of support member 1017 and the second spring subassembly, is controlled by adjustment mechanism 1021. Adjustment mechanism 1021 may be an electro-mechanical system, a pneumatic positioning system or other positioning system. It should be understood that the invention is not limited to a specific adjustment mechanism; rather, the system merely requires a means of controllably positioning the second spring subassembly.

Figure 14:
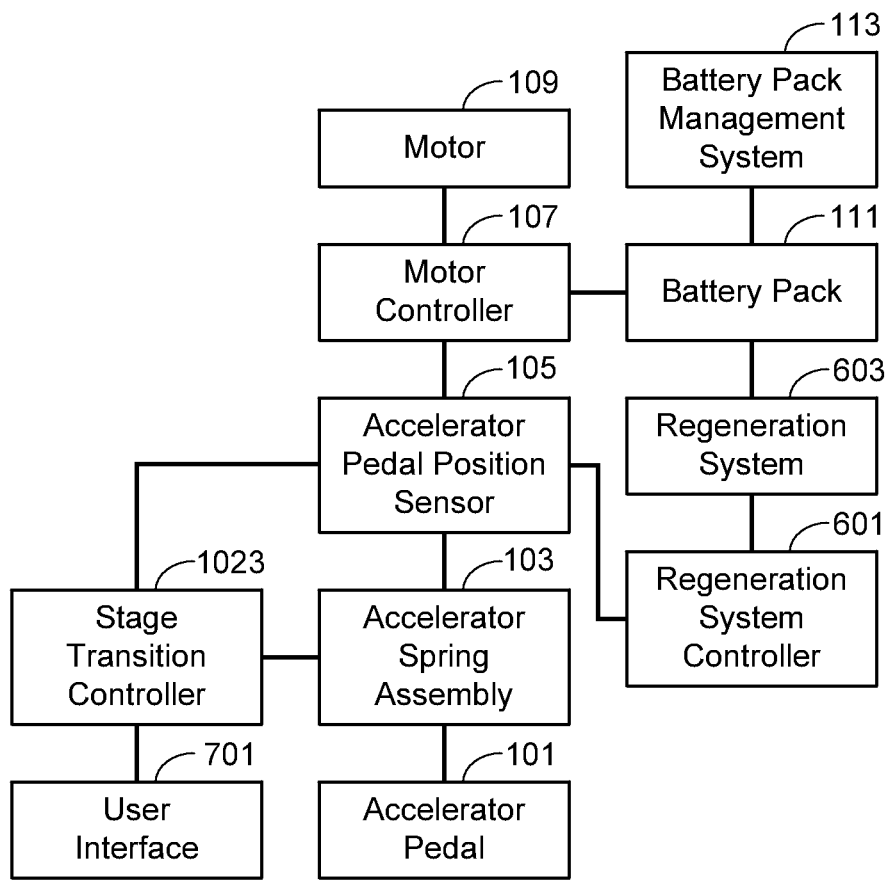
FIG. 14 illustrates the system shown in FIG. 6, modified to include a stage transition controller.

As described above, the position of the second spring subassembly within spring housing 1005 determines the length of the pedal stroke within region 1009, and therefore the amount of the pedal stroke dedicated to the regeneration system rather than motor control. The location of spring support member 1017 and the second spring assembly is determined by positioning mechanism 1021 which, in turn, is determined by stage transition controller 1023. As shown in FIG. 14, the stage transition controller 1023 is coupled to the accelerator spring assembly 103, and more specifically to positioning mechanism 1021 of accelerator spring assembly 103 as described above. A user interface 701, which is coupled to stage transition controller 1023, allows the transition point between the first and second stages to be adjusted after the vehicle is manufactured, for example by the driver, thereby allowing the driver to customize the accelerator pedal stroke. User interface 701, which is preferably integrated into the vehicle's management system, may use a touch-sensitive display, a non-touch-sensitive display combined with any of a variety of switch types (e.g., toggle switches, push button switches, slide switches, etc.), a stand-alone switch (e.g., slide switch, rotary switch, etc.) with several different presets from which to select, or other means that allow the user to select the desired transition point between the first and second stages.

FIGS. 15-18 illustrate a preferred embodiment of the invention using a dual stage spring assembly 1500 in which either, or both, springs may be preloaded. This embodiment allows the accelerator pedal system to communicate at least two different vehicle operating conditions to the driver, plus notify the driver of two different critical operating conditions via spring preloading of two different springs within the assembly. Preferably, and as in the embodiments illustrated in FIGS. 8-13, during the first stage of pedal motion regeneration system 603 actively recharges battery pack 111, assuming the vehicle is in motion, while in the second stage of pedal motion power is supplied to motor 109. In at least one configuration of this embodiment, and as described above relative to the previous embodiments, the system allows the car to coast when the pedal is located between the first and second stages.

In dual stage spring assembly 1500, two different springs 1501 and 1503 are contained within spring housing 1505. The two springs 1501 and 1503 exhibit different spring characteristics, specifically different levels of spring force, thereby allowing the driver to distinguish between the first and second stages of pedal motion. As in the prior embodiments, preferably springs 1501 and 1503 are each comprised of a compression coil spring as shown, although other types of springs may be used. Accelerator pedal arm 201, attached at one end to pedal 101, passes into spring housing 1505 and is coupled to a spring compression member 1507, distal from pedal 101.

In the preferred and illustrated embodiment, when the driver initially applies pressure to pedal 101, weaker spring 1501 is compressed by spring compression member 1507. If the driver increases the pressure on pedal 101, thereby further depressing pedal 101, spring 1501 will become completely compressed within region 1509. Further depression of pedal 101 will then cause spring compression member 1507 to compress spring 1503. In the illustrated embodiment, spring compression member 1507 indirectly compresses spring 1503 using secondary spring compression member 1511. Note that a guide 1513 is preferably used to guide secondary spring compression member 1511 and to insure proper placement of spring 1503 within container 1505. Although not shown, stops may be used to limit the range of motion of pedal 101, and thus the range of compression of the springs within spring housing 1505. The stops may be incorporated into pedal arm 201, or within spring housing 1505.

In the preferred mode of operation, when the car is at rest and the driver first depresses pedal 101, the motion of pedal 101 is relatively easy as the only resistance is provided by weak spring 1501. During this stage of pedal motion, motor controller 107 does not supply power to motor 109 and, since the car is not yet moving, the regeneration system 603 does not generate power to recharge battery pack 111. After spring 1501 is fully compressed, the driver is able to sense the difference in spring force indicative of the change between the first and second stages of pedal operation. If the driver increases the pressure applied to pedal 101 and depresses pedal 101 further, the spring force from the combination of springs 1501 and 1503 will increase pedal resistance. Throughout compression range 1515, regardless of whether the driver is actively depressing or partially releasing pedal 101, motor controller 107 supplies power to motor 109. During deceleration if the driver continues to release pressure on pedal 101, the driver is able to sense the difference in pedal resistance between regions 1515 and 1509 of the spring assembly. After spring compression member 1507 is no longer applying pressure to spring 1503, either directly or indirectly as shown in the preferred embodiment, power is no longer supplied to motor 109 and the regeneration system controller 601 actively recharges battery pack 111 using regeneration system 603. After the driver releases all pressure from pedal 101, the system can be configured to either stop or continue recharging battery pack 111 for as long as the car is still moving.

The embodiment illustrated in FIGS. 15-18 can be configured to provide a third mode of operation, specifically coasting. By applying this mode of operation between stages 1509 and 1515, i.e., once spring 1501 is fully compressed and compression of spring 1503 has not yet begun, the driver is able to easily select between the three modes of operation; power, coasting and regeneration. As previously noted, by foregoing battery recharging via the regeneration system and coasting, the driver is able to extend the distance the car travels for a given amount of energy stored within battery pack 111.

Unlike the embodiment illustrated in FIGS. 8 and 9 in which only one of the springs in the spring assembly may be preloaded, in the embodiment illustrated in FIGS. 15-18 either or both of the springs in the spring assembly may be preloaded, thus allowing additional information to be provided to the driver via differences in pedal return force.

Figure 15:
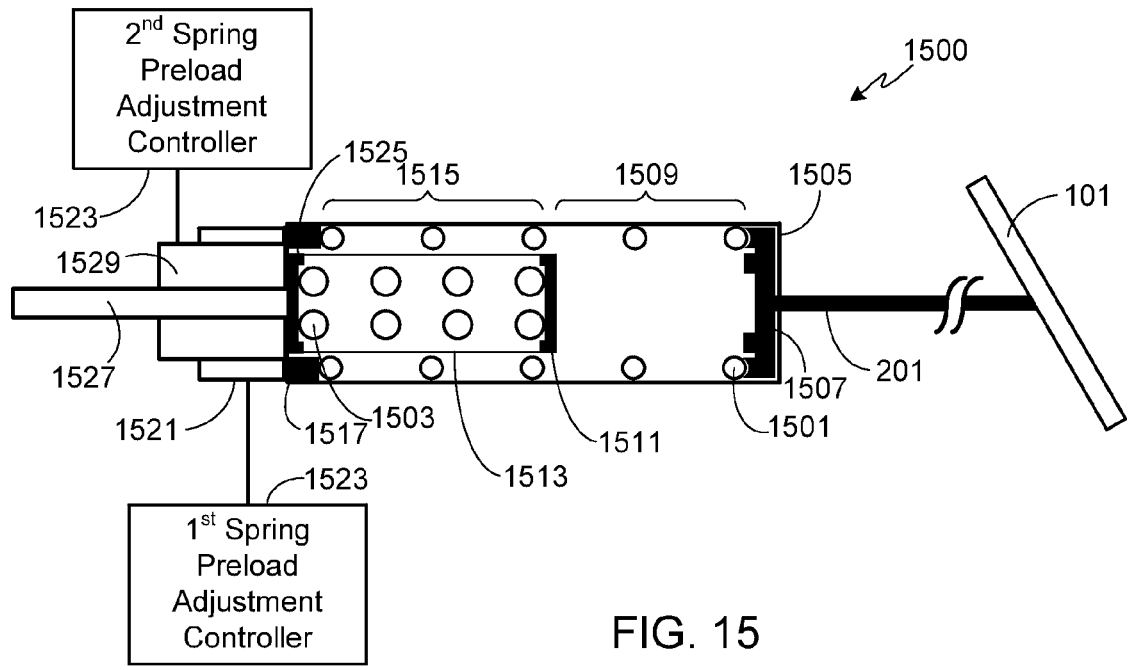
FIG. 15 provides a cross-sectional view of an accelerator spring assembly in accordance with an alternate preferred embodiment.
Figure 16:
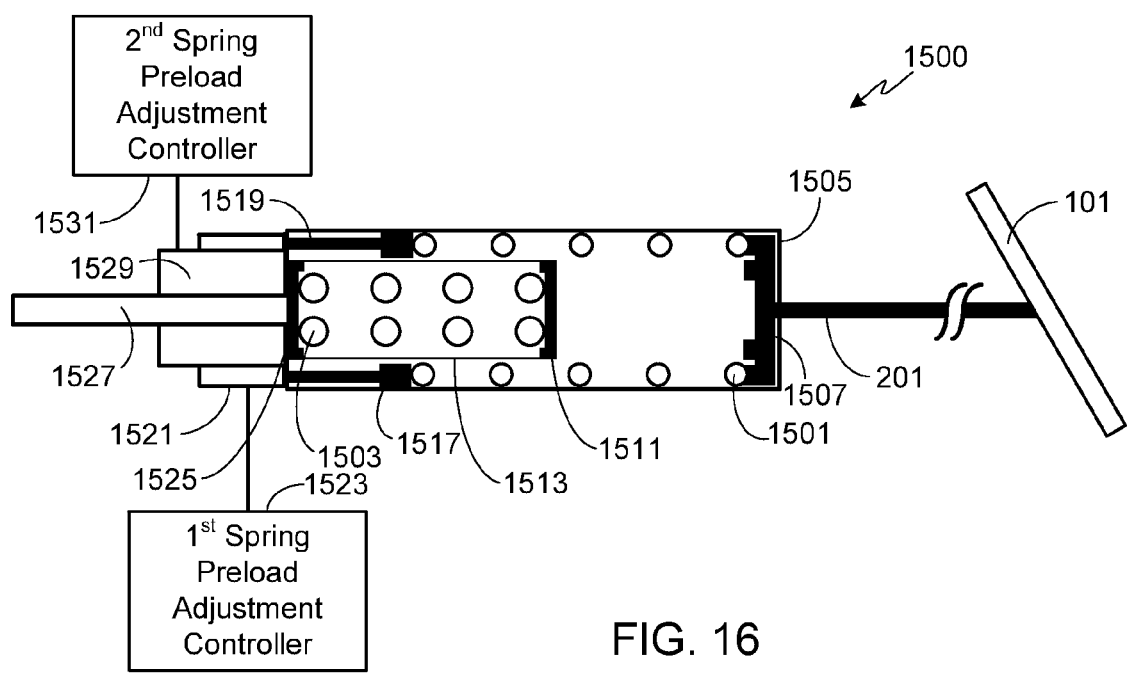
FIG. 16 illustrates the same accelerator spring assembly shown in FIG. 15 after preloading of the first spring.

FIG. 16 illustrates the technique used to preload spring 1501. The front face of spring 1501 rests against spring compression member 1507 while the rear face of spring 1501 rests against a rear spring support member 1517. The position of support member 1517 within spring housing 1505 is adjustable, at least between a first position (see FIG. 15) and a second position (see FIG. 16), and in some applications over a range of positions. In the embodiment shown in FIGS. 15 and 16, support member 1517 is coupled to at least one, and preferably multiple positioning rods 1519. The location of positioning rods 1519, and therefore the location of rear spring support member 1517, is controlled by adjustment mechanism 1521. Controller 1523 determines whether or not to preload spring 1501 and, at least in some embodiments, the level of preloading to be applied to spring 1501. Adjustment mechanism 1521 may be an electro-mechanical system, a pneumatic positioning system or other positioning system. It should be understood that the invention is not limited to a specific adjustment mechanism; rather, the system merely requires a means of controllably positioning spring support member 1517.

The location of rear spring support member 1517 determines the force applied by spring 1501 to the spring compression member 1507, and thus the resistance encountered by the driver as they depress accelerator pedal 101 within the first stage 1509 of the pedal stroke. Although not required, preferably this stage 1509 of the pedal stroke corresponds to the regeneration portion of the stroke. Any of a variety of monitored characteristics may be used to determine when to preload spring 1501 using rear spring support member 1517. For example, spring 1501 preloading may be used to indicate a characteristic of the regeneration system such as a different level of regeneration, regardless of whether the level of regeneration is user selected or vehicle selected based on battery needs. Alternately, spring 1501 preloading may be used to indicate that a battery pack characteristic, such as the current battery level, has fallen below (or exceeded) a preset level.

Alternately, spring 1501 preloading may be used to alert the driver of a system or subsystem error (e.g., battery pack malfunction, battery overheating, regeneration system malfunction, etc.).

Figure 17:
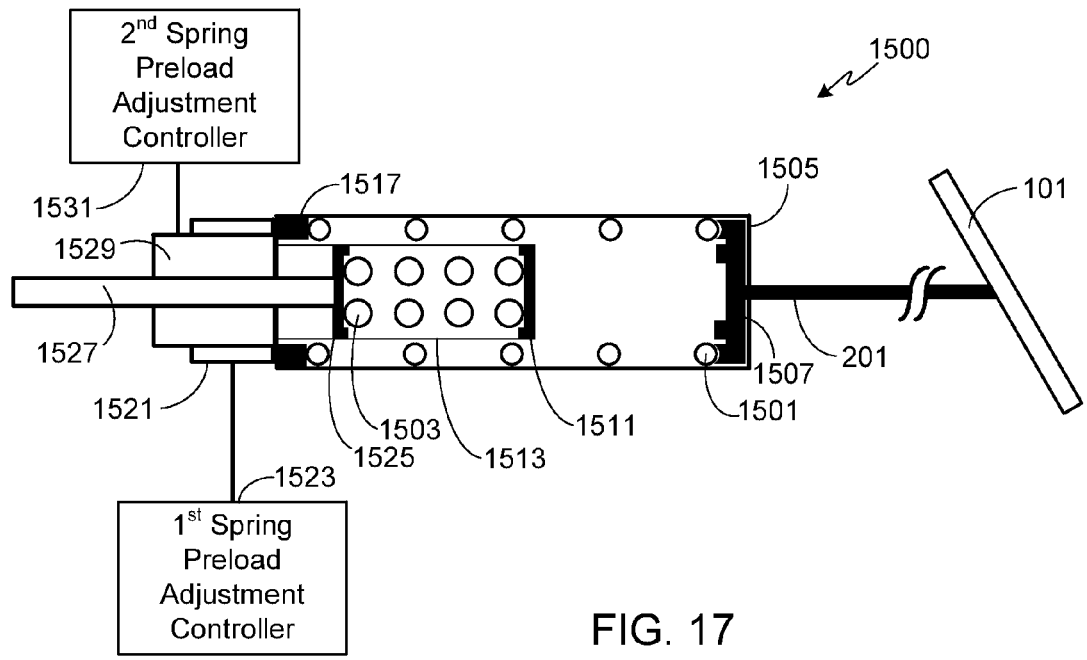
FIG. 17 illustrates the same accelerator spring assembly shown in FIG. 15 after preloading of the second spring.

FIG. 17 illustrates the technique used to preload spring 1503. The location of rear spring support member 1525 determines the force applied by spring 1503 to the secondary spring compression member 1511, and thus the resistance encountered by the driver as they depress accelerator pedal 101 within the second stage 1515 of the pedal stroke, e.g., the accelerator portion versus the regeneration portion of the stroke. The position of rear spring support member 1525 relative to secondary spring compression member 1511 is adjustable. Rear spring support member 1525 is coupled to at least one positioning rod 1527. The location of the positioning rod(s) 1527, and therefore the location of rear spring support member 1525, is controlled by adjustment mechanism 1529. Adjustment mechanism 1529 may be an electromechanical system, a pneumatic positioning system or other positioning system. It should be understood that the invention is not limited to a specific adjustment mechanism; rather, the system merely requires a means of controllably positioning the second spring subassembly.

Although any of a variety of monitored characteristics may be used to determine when to preload spring 1503 using rear spring support member 1525, preferably a battery characteristic such as current battery capacity or current available driving range is used. As such, when the preselected characteristic, for example a battery pack characteristic monitored by battery pack management system 113, reaches a predetermined level, then second spring preload adjustment controller 1531 adjusts the position of rear spring support member 1525 using mechanism 1529, thereby compressing and preloading spring 1503. As a result of preloading spring 1503, as the driver depresses pedal 101 past the regeneration stage (region 1509), or if the pedal stroke has already traveled past the regeneration stage, then the driver will be immediately alerted to the change in the monitored battery pack characteristic (e.g., current battery pack capacity, current available driving range, etc.). Once the driver has been alerted to the fact that the battery pack capacity (or other characteristic) has fallen to a critically low level, appropriate action can be taken such as varying the travel route and/or driving characteristics (e.g., acceleration rate, top speed, applying power versus coasting, etc.).

Figure 18:
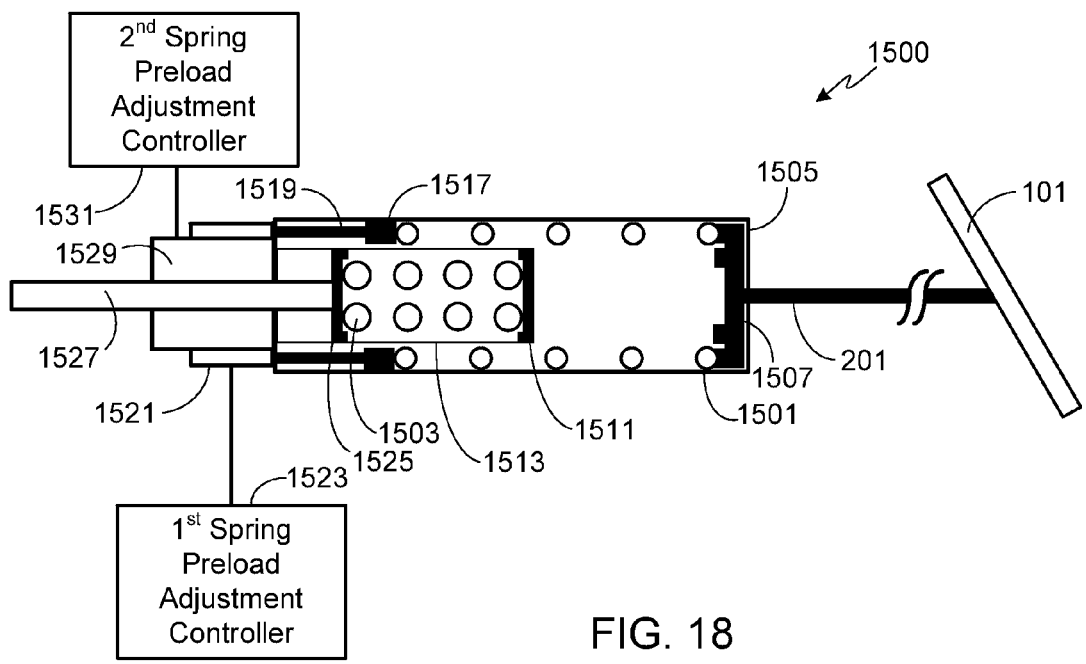
FIG. 18 illustrates the same accelerator spring assembly shown in FIG. 15 after preloading of both the first and second springs.
Figure 19:
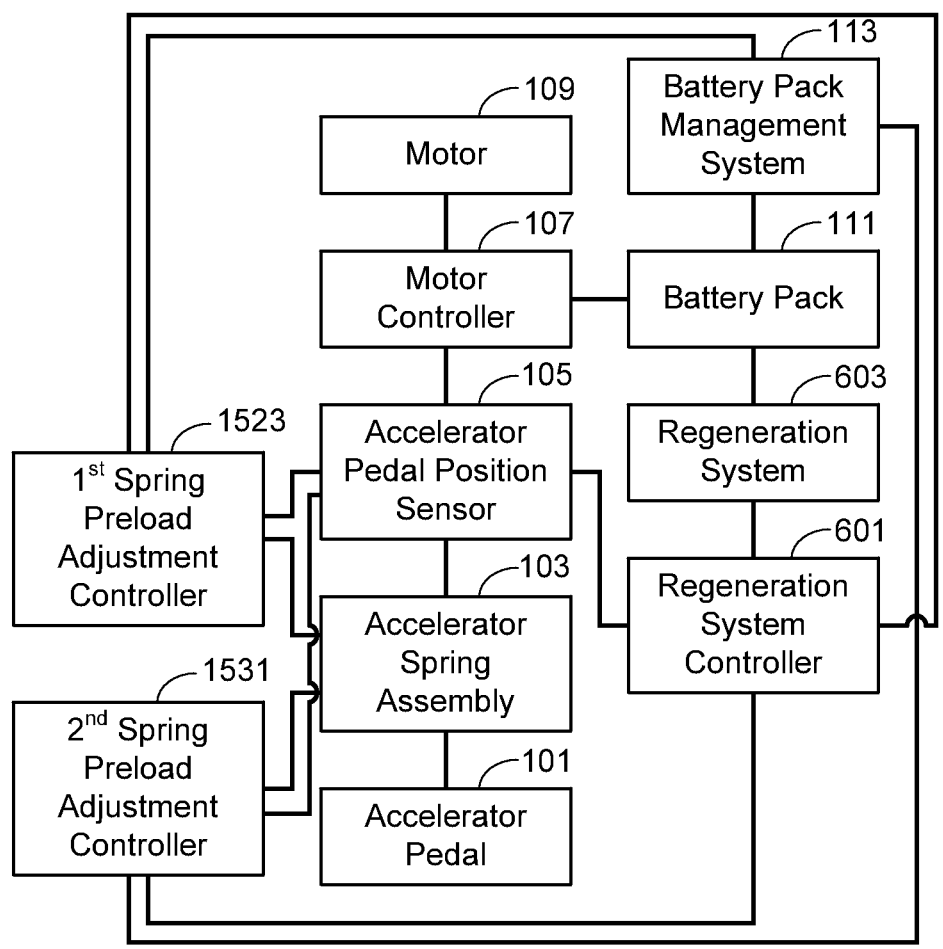
FIG. 19 illustrates the system shown in FIG. 6, modified to include a pair of spring load adjustment controllers.
Figure 20:
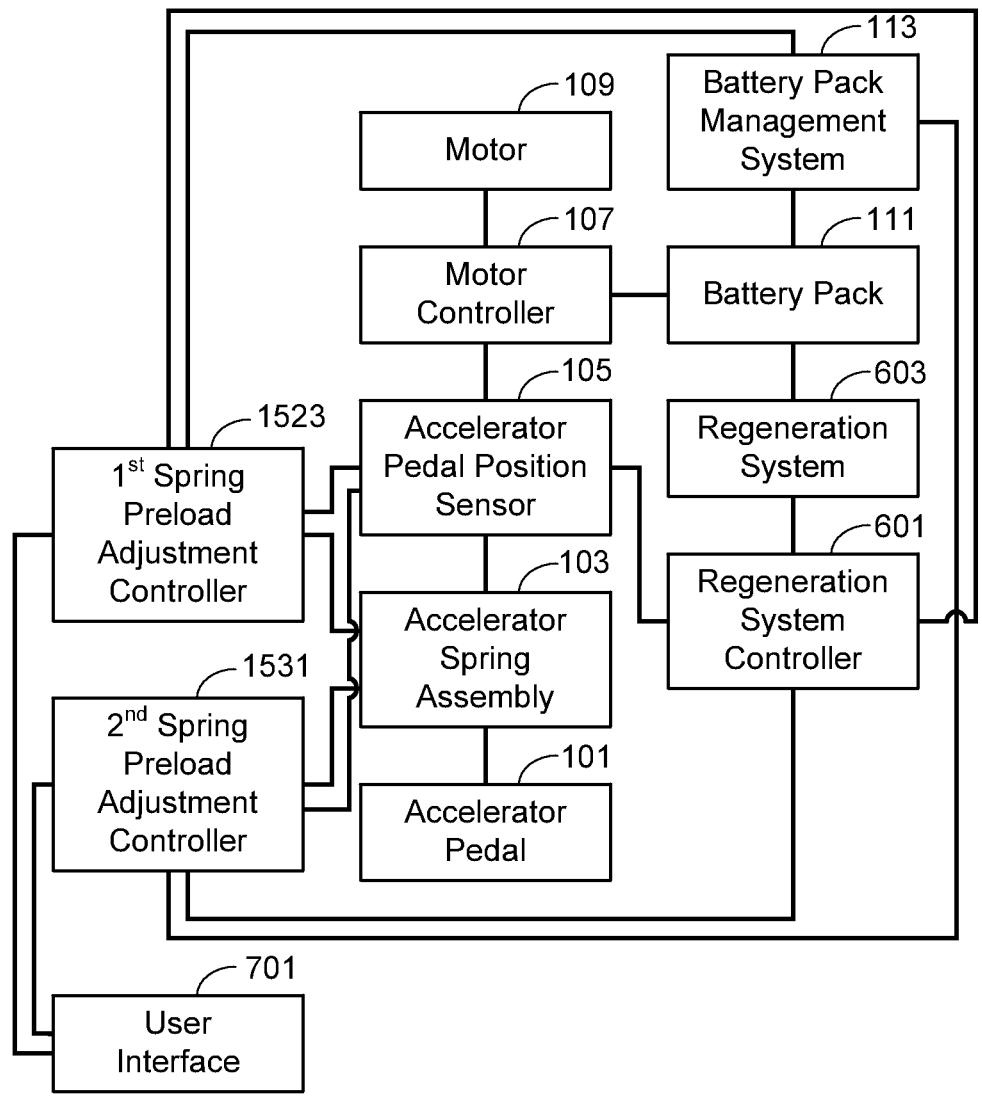
FIG. 20 illustrates the system shown in FIG. 7, modified to include a pair of spring load adjustment controllers.

An advantage of the present embodiment is that springs 1501 and 1503 may be preloaded independently of one another. Additionally, either one spring or both springs may be preloaded. FIG. 18 illustrates the embodiment with both springs 1501 and 1503 preloaded. FIG. 19 provides a system schematic of the dual stage spring assembly shown in FIGS. 15-18. While the spring preload adjustment controllers are typically only coupled to those systems that monitor the characteristic being used to determine when to preload the corresponding spring, in the embodiment illustrated in FIG. 19, both spring preload adjustment controllers are coupled to both the battery pack management system 113 and the regeneration system controller 601, thus adding versatility to the spring preload controllers. A user interface 701 may be coupled to the spring preload adjustment controllers as shown in FIG. 20, thereby allowing the driver to adjust the spring preload subsystems. As previously noted, user interface 701 may use a touch-sensitive display, a non-touch-sensitive display combined with any of a variety of switch types (e.g., toggle switches, push button switches, slide switches, etc.), a stand-alone switch (e.g., slide switch, rotary switch, etc.) with several different presets from which to select, or other means that allow the user to preset the preload characteristics for springs 1501 and 1503.

Figure 21:
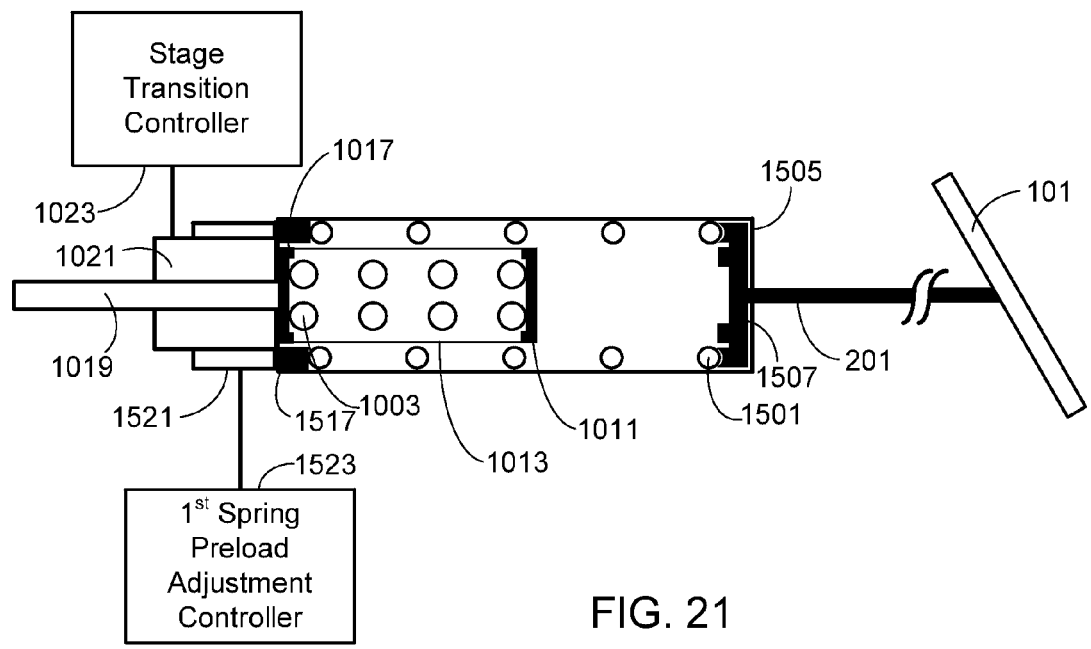
FIG. 21 provides a cross-sectional view of an accelerator spring assembly in accordance with an alternate preferred embodiment.
Figure 22:
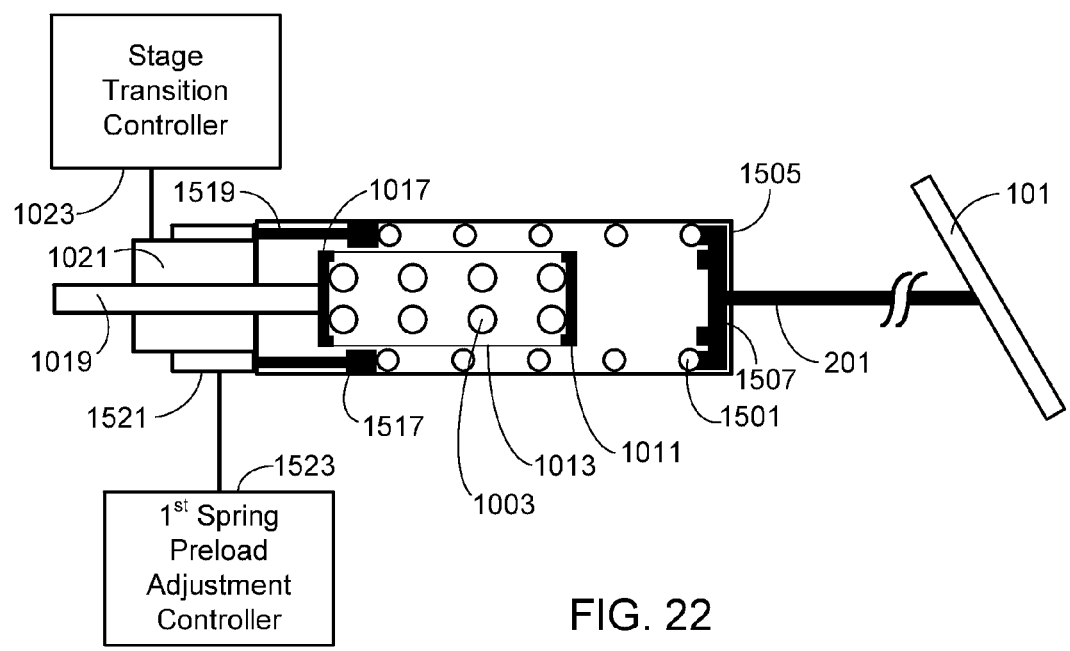
FIG. 22 illustrates the same accelerator spring assembly shown in FIG. 21 after adjustment of the first/second stage transition point and preloading of the first spring.

In at least one embodiment of the invention, the ability to alter the transition point between the first and second stages of accelerator pedal stroke may be combined with the ability to preload one or both springs in the spring assembly. For example, FIGS. 21 and 22 illustrate the combination of the system that allows adjustment of the point at which the pedal assembly switches between the first and second stages of operation as shown in FIGS. 10 and 13 with a first spring preloading system as illustrated in FIGS. 15 and 16. FIG. 21 illustrates this embodiment with no preloading of spring 1501 and with the first stage of pedal motion maximized while FIG. 22 illustrates the same embodiment with spring 1501 preloaded and the first stage of pedal motion shortened. It should be understood that spring 1501 may be preloaded without altering the length of the first stage of pedal motion and, similarly, the first stage of pedal motion may be shortened without preloading spring 1501.

Figure 23:
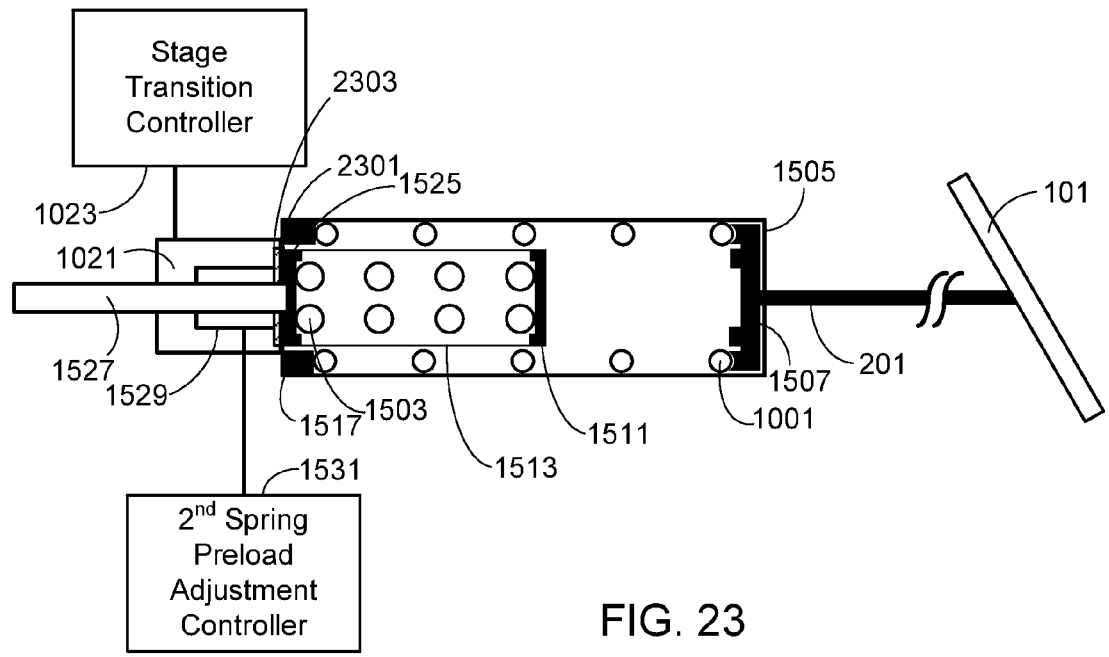
FIG. 23 provides a cross-sectional view of an accelerator spring assembly in accordance with an alternate preferred embodiment.
Figure 24:
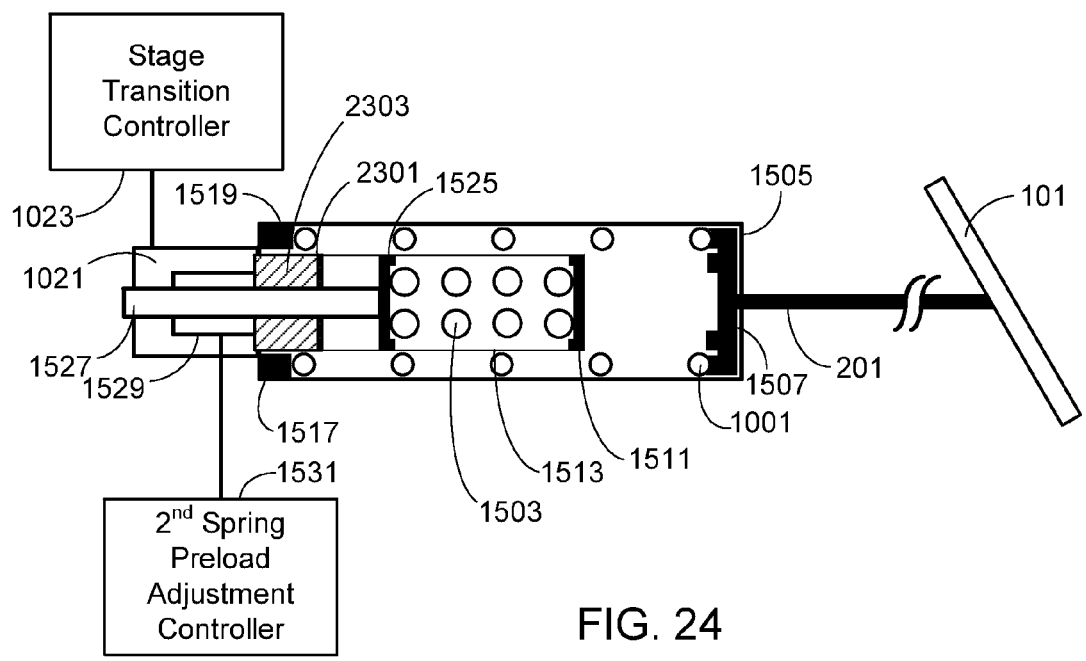
FIG. 24 illustrates the same accelerator spring assembly shown in FIG. 23 after adjustment of the first/second stage transition point and preloading of the second spring.

FIGS. 23 and 24 illustrate a system combination that allows adjustment of the point at which the pedal assembly switches between the first and second stages of operation as shown in FIGS. 10 and 13 with a second spring preloading system as illustrated in FIGS. 15 and 17. FIG. 23 illustrates this embodiment with no preloading of spring 1503 and with the first stage of pedal motion maximized while FIG. 24 illustrates the same embodiment with spring 1503 preloaded and the first stage of pedal motion shortened. In this embodiment the second spring assembly includes spring 1503, rear spring support member 1525, rear second spring assembly support member 2301, spring guide 1513 and the secondary spring compression member 1511. The position of the entire second spring subassembly within spring housing 1505 is adjustable by moving spring assembly support member 2301 using positioning member 2303 and adjustment mechanism 1021. The position of rear spring support member 1525 within the second spring subassembly and relative to secondary spring compression member 1511, and thus the amount of spring preloading imparted to spring 1503, is adjustable via positioning rod(s) 1527 and adjustment mechanism 1529. It should be understood that spring 1503 may be preloaded without altering the length of the first stage of pedal motion and, similarly, the first stage of pedal motion may be shortened without preloading spring 1503.

Figure 25:
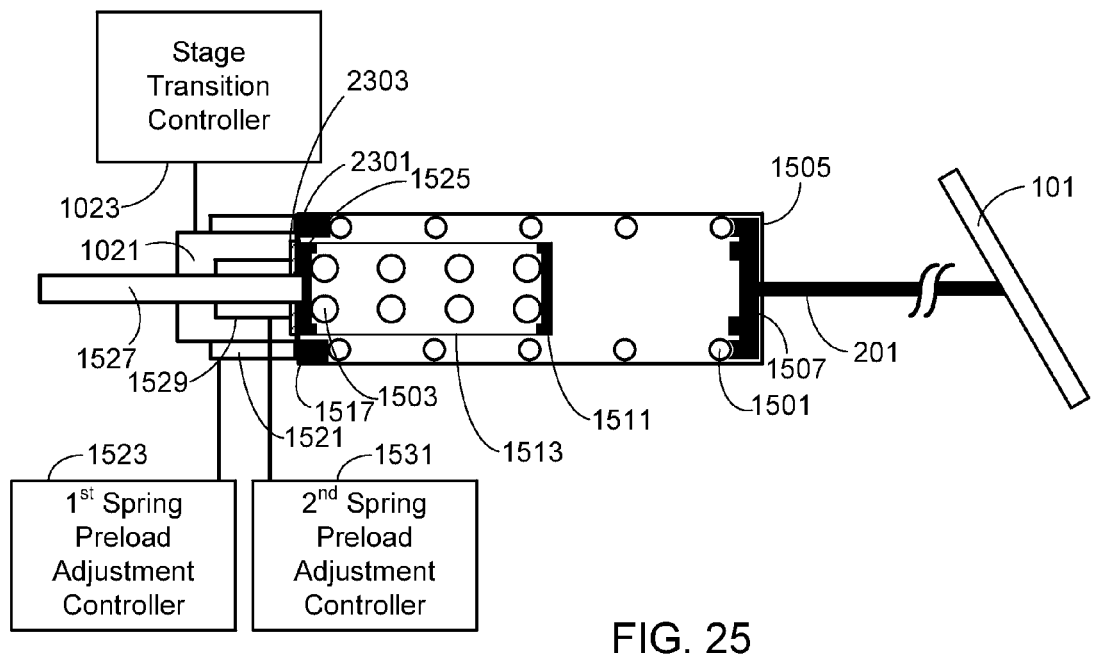
FIG. 25 provides a cross-sectional view of an accelerator spring assembly in accordance with an alternate preferred embodiment.
Figure 26:
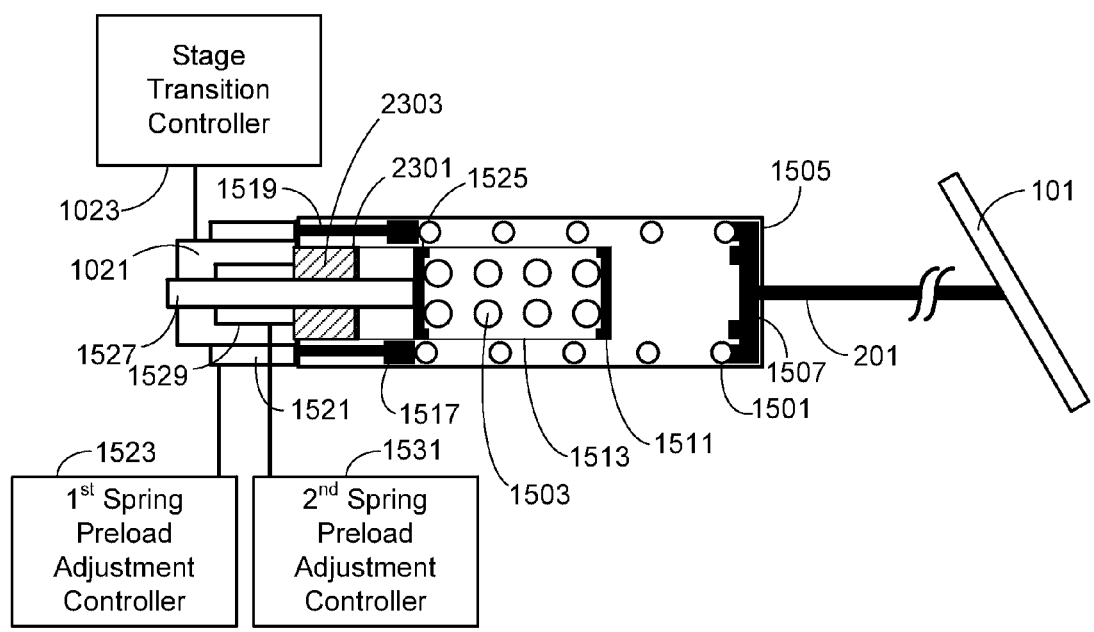
FIG. 26 illustrates the same accelerator spring assembly shown in FIG. 25 after adjustment of the first/second stage transition point and preloading of both the first and second springs.

FIGS. 25 and 26 illustrate a system embodiment that allows adjustment of the point at which the pedal assembly switches between the first and second stages of operation as shown in FIGS. 10, 13, 22 and 24 with a first spring preloading system as shown in FIGS. 15, 16 and 22 and a second spring preloading system as illustrated in FIGS. 15, 17 and 24. FIG. 25 illustrates this embodiment with the first stage of pedal motion maximized and with no preloading of either spring 1501 or spring 1503. FIG. 26 illustrates the same embodiment with the first stage of pedal motion shortened and both spring 1501 and spring 1503 preloaded. It should be understood that spring 1501 may be preloaded without altering the length of the first stage of pedal motion and/or preloading spring 1503; that spring 1503 may be preloaded without altering the length of the first stage of pedal motion and/or preloading spring 1501; and that the first stage of pedal motion may be shortened without preloading either or both springs 1501 and 1503.

Figure 27:
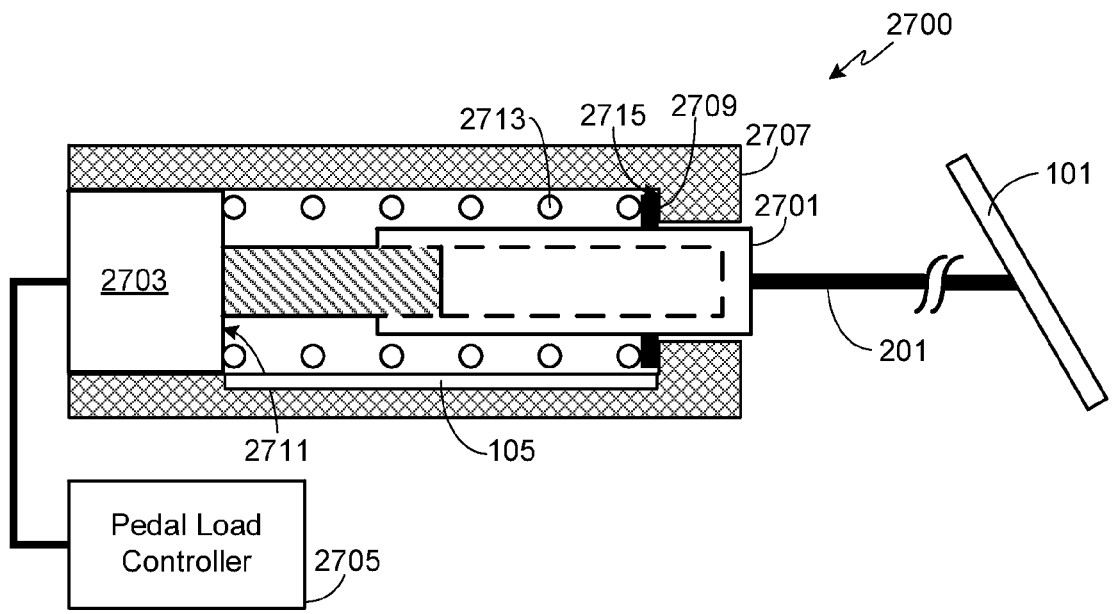
FIG. 27 provides a cross-sectional view of an accelerator spring assembly in accordance with an alternate preferred embodiment.
Figure 28:
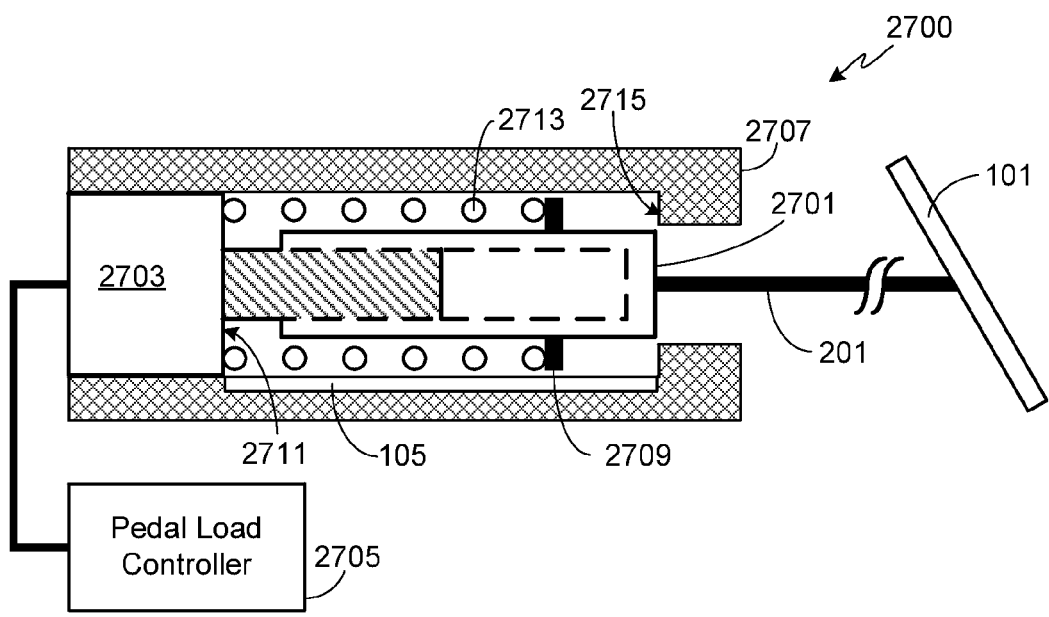
FIG. 28 illustrates the same accelerator spring assembly shown in FIG. 27 after the accelerator pedal has been partially depressed.

FIGS. 27 and 28 illustrate an alternate embodiment of the invention that offers the advantages of the previously described accelerator assemblies in a more versatile system. In assembly 2700, a positioning mechanism 2701 coupled to a drive system 2703 is used to vary the resistance applied to pedal linkage arm 201, and thus the return force applied to pedal 101 and felt by the driver as they depress and release the accelerator pedal. Positioning mechanism 2701 may be mechanical, for example a simple screw mechanism, in which case the force applied to linkage arm 201 via mechanism 2701 is supplied by a motor 2703. Alternately, positioning mechanism 2701 may be comprised of a piston assembly and drive system 2703 may be comprised of a hydraulic or pneumatic pump with a hydraulic or pneumatic reservoir. Controller 2705 determines the amount of force to be applied by positioning mechanism 2701 and driver 2703 to pedal linkage arm 201 and pedal 101.

In the illustrated embodiment, the assembly is contained with a housing 2707 which can provide a guide for positioning mechanism 2701. Attached to mechanism 2701 is a spring compression member 2709, which may be in the form of a ring surrounding mechanism 2701. Interposed between compression member 2709 and inner assembly surface 2711 is a spring 2713. As in the prior embodiments, preferably spring 2713 is comprised of a compression coil spring as shown, although other types of springs may be used. Spring 2713 applies a nominal return force to linkage arm 201 and pedal 101, thereby insuring that even if drive system 2703 malfunctions, return force is applied to pedal 101 and the risk of unintentional vehicle acceleration is avoided. In the illustrated embodiment, inner surface 2715 of housing 2707 provides a pedal stop, limiting outward motion of spring compression member 2709.

In a preferred mode of operation utilizing assembly 2700, when the car is at rest and the driver first depresses pedal 101, the motion of pedal 101 is relatively easy as subassembly 2701/2703 is preferably configured to apply little return force during the initial pedal stroke and spring 2713 is a relatively weak spring. During this stage of pedal motion, motor controller 107 does not supply power to motor 109 and, since the car is not yet moving, the regeneration system 603 does not generate power to recharge battery pack 111. After the pedal has reached a preset level of travel as determined by pedal position sensor 105, where sensor 105 is preferably integrated into assembly 2700, pedal load controller 2705 increases the return force applied to pedal 101 to a sufficient degree to insure that the driver is immediately able to sense the difference in force indicative of a change between a first stage and a second stage of pedal operation. If the driver continues to depress pedal 101 after this transition point, then she will experience an increase in pedal resistance. At the transition point between the first and second pedal strokes, the system is configured to de-activate the regeneration system and to supply power to motor 109. Throughout this stage of pedal movement, regardless of whether the driver is actively depressing or partially releasing pedal 101, motor controller 107 supplies power to motor 109. The system continually monitors pedal position via sensor 105 so that once the pedal has traveled sufficiently backwards towards the driver as the driver releases pressure on pedal 101, pedal load controller modifies the return force applied by subassembly 2701/2703 back to its stage one level. Once again, the driver is able to immediately detect the difference in pedal resistance, indicating that power is no longer being supplied to motor 109 and that the regeneration system controller 601 is actively recharging battery pack 111 using regeneration system 603. After the driver releases all pressure from pedal 101, the system can be configured to either stop or continue recharging battery pack 111 for as long as the car is still moving.

Figure 29:
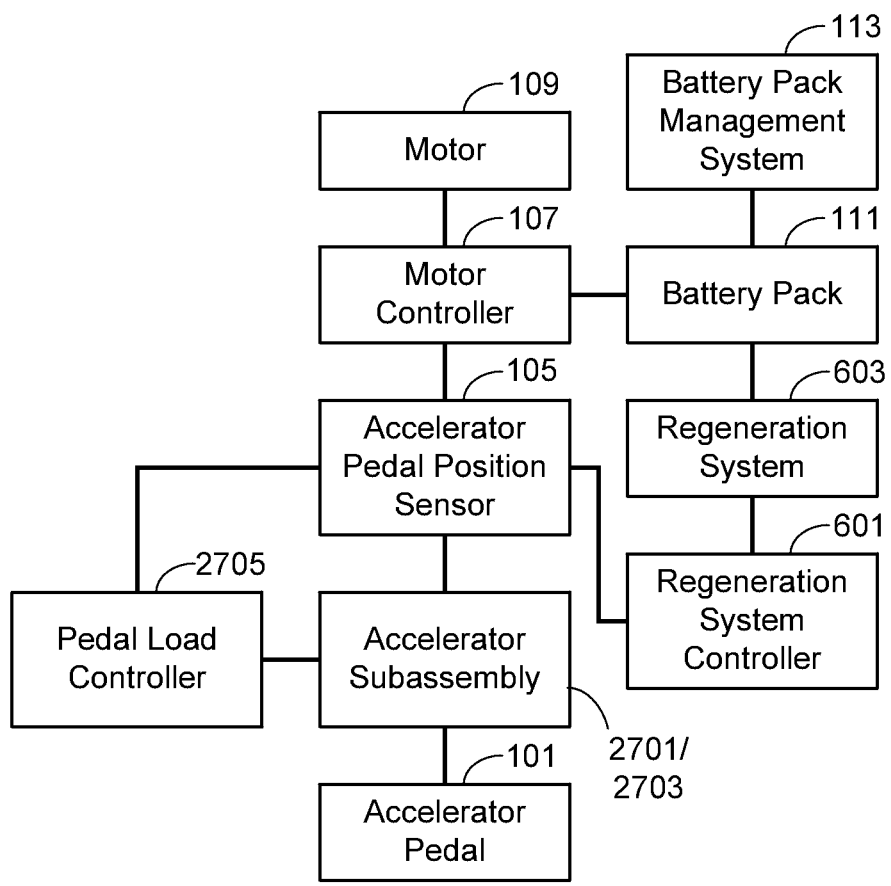
FIG. 29 illustrates the system shown in FIG. 6, modified to include a pedal preload controller suitable for use with the accelerator spring assembly shown in FIGS. 27-28.
Figure 30:
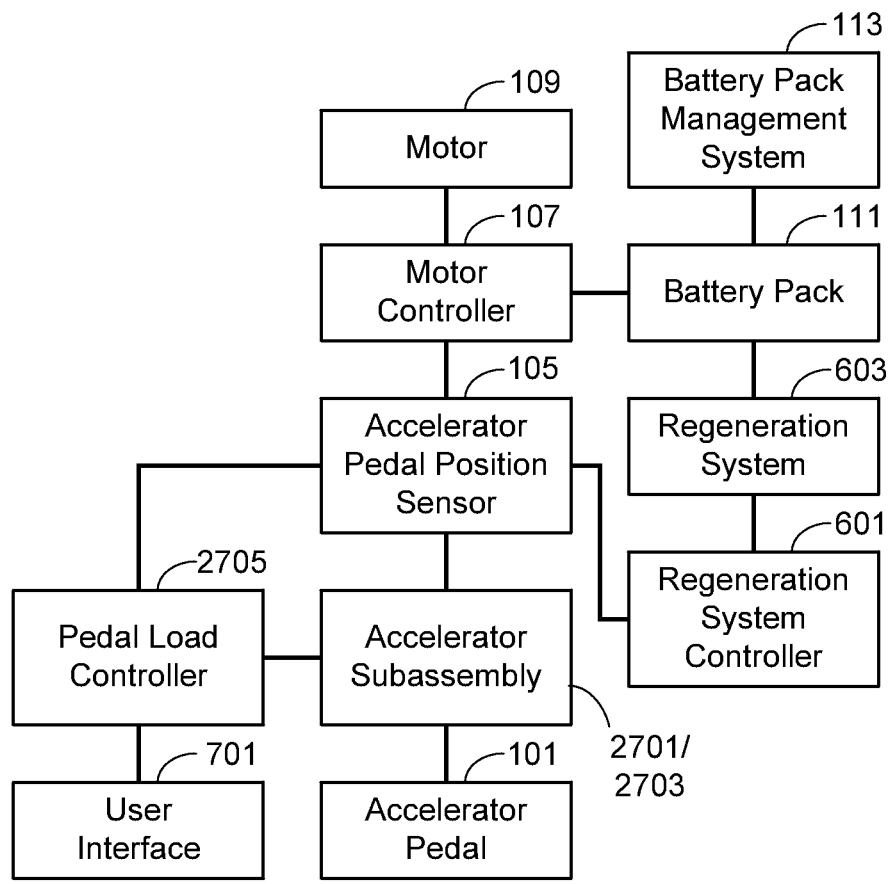
FIG. 30 illustrates the system shown in FIG. 29, modified to include a user interface.

The transition point between the first and second stages of pedal motion is determined by the point at which pedal load controller 2705 modifies the return force applied by subassembly 2701/2703. This transition point may be preset by the manufacturer or its agents (e.g., service technician) and as such, the system will utilize a configuration such as that illustrated in FIG. 29. In at least one embodiment, and as illustrated in FIG. 30, a user interface 701 is coupled to pedal load controller 2705. User interface 701 provides a means for the user to adjust the point at which the pedal assembly switches between the first stage and the second stage of operation and, as a result, allows the user to shorten or lengthen the amount of pedal motion associated with the regeneration system.

As in prior embodiments, assembly 2700 can be configured to provide a third mode of operation, specifically coasting. In this configuration, when sensor 105 determines that the pedal has been depressed to the transition point between the first and second stages of operation, regardless of whether the transition point is set by the vehicle manufacturer, a third party or the user, the system allows a third mode of operation, i.e., coasting. During coasting, and as previously described, power is neither supplied to motor 109 nor is the regeneration system active. As previously noted, by foregoing battery recharging via the regeneration system and coasting, the driver is able to extend the distance the car travels for a given amount of energy stored within battery pack 111.

Pedal load controller 2705 may also be used to communicate a change in a monitored vehicle condition, such as the battery level dropping below a preset capacity, or the available driving range dropping below a preset range, or a battery pack malfunction, or a regeneration system malfunction, or other information. The preset condition used to trigger the pedal load controller 2705, thereby causing a detectable change in pedal resistance, may be set-up by the vehicle manufacturer or by the user utilizing user interface 701. Preferably if the user is allowed to alter the preset, they are provided with several different options. For example, the system may allow the user to select the pre-set battery pack condition that triggers modifying return force from several conditions (e.g., battery pack capacity, driving range, battery malfunction, etc.), and/or select the value for the selected condition that triggers modifying return force from multiple values (e.g., 10 percent, 15 percent, 20 percent, 25 percent battery pack capacity), thus allowing the system to be customized to match an individual driver's preferences.

It should be understood that load controller 2705 can modify return force/pedal resistance at any time during the pedal stroke, i.e., either prior to depression of pedal 101 or after the pedal has been partially depressed. As a result, assembly 2700 may communicate a critical condition (e.g., low battery pack level, short available driving range, system malfunction, etc.) at any time to the driver. Furthermore, since pedal load controller 2705 can modify return force over a wide range, then assembly 2700 may be configured to change pedal resistance in order to denote a change in driving mode (e.g., applying power to motor 109, recharging battery 111 using regeneration system 603, coasting); to denote a change in a monitored vehicle condition (e.g., battery pack level, available driving range, malfunction, etc.); or to denote both.

Although simple spring preloading is described above relative to the various preferred embodiments, the spring preloading system of the invention may also communicate a critical condition (e.g., low battery pack level, short available driving range, system malfunction, etc.) by pulsing the preload controller, thus causing pedal 101 to vibrate, thereby alerting the driver of a detected problem. Furthermore, while preferred spring assembly configurations have been illustrated and described, it will be appreciated that other configurations, for example using a different type of spring or spring housing, may also be used without changing the functionality and approach described relative to each of these embodiments.

Spring assembly systems and methods of operation have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular vehicle configuration or spring type or vehicle application or material or component, without departing from the spirit or essential characteristics thereof. Therefore the disclosures and descriptions herein are intended to be illustrative, but not limiting, of the scope of the invention.

What is claimed is:

1. A dual stage vehicle pedal accelerator assembly, comprising:
   an accelerator pedal; and
   a first spring assembly, wherein an accelerator linkage arm couples said accelerator pedal to said first spring assembly, said first spring assembly comprising:
      a first spring;
      a second spring assembly comprised of a second spring and a rear second spring assembly support member proximate to a second end of said second spring, wherein a position of said second spring assembly relative to said first spring determines a transition point between a first pedal stroke stage and a second pedal stroke stage;
      a spring compression member coupled to said accelerator linkage arm and proximate to a first end of said first spring, wherein during an initial stage of accelerator pedal travel corresponding to said first pedal stroke stage said spring compression member only compresses said first spring, and wherein during a final stage of accelerator pedal travel corresponding to said second pedal stroke stage said spring compression member compresses both said first spring and said second spring;
      a rear spring support member proximate to a second end of said first spring, said rear spring support member positionable in at least a first position and a second position, wherein said rear spring support member in said second position increases preload compression of said first spring compared to said first position of said rear spring support member, and wherein said rear spring support member in said second position increases accelerator pedal resistance compared to said first position of said rear spring support member;
      a first adjustment mechanism coupled to said rear spring support member, wherein upon receipt of a first control signal said first adjustment mechanism is configured to move said rear spring support member to said first position, and wherein upon receipt of a second control signal said first adjustment mechanism is configured to move said rear spring support member to said second position; and
      a second adjustment mechanism coupled to said rear second spring assembly support member, wherein upon receipt of a third control signal said second adjustment mechanism is configured to move said second spring assembly to a first position relative to said first spring, and wherein upon receipt of a fourth control signal said second adjustment mechanism is configured to move said second spring assembly to a second position relative to said first spring, wherein said first pedal stroke stage is shorter when said second spring assembly is in said second position compared to said first pedal stroke stage when said second spring assembly is in said first position.

2. The dual stage vehicle pedal accelerator assembly of claim 1, further comprising:
   a regeneration system coupled to a vehicle battery pack, said regeneration system configured to recharge said vehicle battery pack when activated;
   a pedal stroke position sensor, wherein said pedal stroke position sensor monitors travel of said accelerator pedal and detects said initial stage of accelerator pedal travel corresponding to said first pedal stroke stage and detects said final stage of accelerator pedal travel corresponding to said second pedal stroke stage; and
   a regeneration system controller coupled to said pedal stroke position sensor and to said regeneration system, said regeneration system controller configured to activate said regeneration system during said first pedal stroke stage and configured to deactivate said regeneration system during said second pedal stroke stage.

3. The dual stage vehicle pedal accelerator assembly of claim 2, wherein during said second pedal stroke stage said vehicle battery pack is electrically coupled to a vehicle propulsion motor.

4. The dual stage vehicle pedal accelerator assembly of claim 3, said regeneration system controller further configured to deactivate said regeneration system after completion of said first pedal stroke stage and prior to initiation of said second pedal stroke stage.

5. The dual stage vehicle pedal accelerator assembly of claim 1, wherein said first spring is comprised of a compression coil spring.

6. The dual stage vehicle pedal accelerator assembly of claim 1, wherein said second spring is comprised of a compression coil spring.

7. The dual stage vehicle pedal accelerator assembly of claim 1, wherein a first spring force corresponding to said first spring is less than a second spring force corresponding to said second spring.

8. The dual stage vehicle pedal accelerator assembly of claim 1, wherein said first spring is comprised of a first compression coil spring, and wherein said second spring assembly is contained within said first compression coil spring.

9. The dual stage vehicle pedal accelerator assembly of claim 1, said second spring assembly further comprising a spring guide, said spring guide configured to guide said second spring during said second pedal stroke stage.

10. The dual stage vehicle pedal accelerator assembly of claim 1, further comprising a second spring compression member interposed between said first spring compression member and said second spring.

11. The dual stage vehicle pedal accelerator assembly of claim 1, further comprising at least one positioning member of a first type, wherein said at least one positioning member of said first type couples said first adjustment mechanism to said first rear spring support member, and further comprising at least one positioning member of a second type, wherein said at least one positioning member of said second type couples said second adjustment mechanism to said rear second spring assembly support member.

12. The dual stage vehicle pedal accelerator assembly of claim 1, wherein said first adjustment mechanism is comprised of an electric motor.

13. The dual stage vehicle pedal accelerator assembly of claim 1, wherein said first adjustment mechanism is comprised of a pneumatic positioning system.

14. The dual stage vehicle pedal accelerator assembly of claim 1, wherein said second adjustment mechanism is comprised of an electric motor.

15. The dual stage vehicle pedal accelerator assembly of claim 1, wherein said second adjustment mechanism is comprised of a pneumatic positioning system.

16. The dual stage vehicle pedal accelerator assembly of claim 1, further comprising a preload adjustment controller coupled to said first adjustment mechanism, said preload adjustment controller configured to transmit said first and second control signals to said first adjustment mechanism.

17. The dual stage vehicle pedal accelerator assembly of claim 16, further comprising:
 a regeneration system coupled to a vehicle battery pack, said regeneration system configured to recharge said vehicle battery pack when activated;
 a pedal stroke position sensor, wherein said pedal stroke position sensor monitors travel of said accelerator pedal and detects said initial stage of accelerator pedal travel corresponding to said first pedal stroke stage and detects said final stage of accelerator pedal travel corresponding to said second pedal stroke stage; and
 a regeneration system controller coupled to said pedal stroke position sensor and to said regeneration system and to said preload adjustment controller, said regeneration system controller configured to activate said regeneration system during said first pedal stroke stage and configured to deactivate said regeneration system during said second pedal stroke stage, wherein said regeneration system controller monitors at least one characteristic of said regeneration system, wherein said preload adjustment controller transmits said first control signal to said first adjustment mechanism when said at least one characteristic is within a preset range, and wherein said preload adjustment controller transmits said second control signal to said first adjustment mechanism when said at least one characteristic is outside of said preset range.

18. The dual stage vehicle pedal accelerator assembly of claim 1, further comprising a stage transition controller coupled to said second adjustment mechanism, said stage transition controller configured to transmit said third and fourth control signals to said second adjustment mechanism.

19. The dual stage vehicle pedal accelerator assembly of claim 17, wherein said preset range is input by a vehicle manufacturer.

20. The dual stage vehicle pedal accelerator assembly of claim 17, further comprising a user interface coupled to said preload adjustment controller, wherein said preset range is input into said preload adjustment controller via said user interface.

21. The dual stage vehicle pedal accelerator assembly of claim 16, further comprising a battery pack management system coupled to a vehicle battery pack and to said preload adjustment controller, wherein said battery pack management system monitors at least one characteristic of said vehicle battery pack, wherein said preload adjustment controller transmits said first control signal to said first adjustment mechanism when said at least one characteristic of said vehicle battery pack is within a preset range, and wherein said preload adjustment controller transmits said second control signal to said first adjustment mechanism when said at least one characteristic of said vehicle battery pack is outside of said preset range.

22. The dual stage vehicle pedal accelerator assembly of claim 21, wherein said at least one characteristic of said vehicle battery pack corresponds to a current battery pack capacity.

23. The dual stage vehicle pedal accelerator assembly of claim 21, wherein said at least one characteristic of said vehicle battery pack corresponds to an available driving range based on a current battery pack capacity.

24. The dual stage vehicle pedal accelerator assembly of claim 21, wherein said preset range is input by a vehicle manufacturer.

25. The dual stage vehicle pedal accelerator assembly of claim 21, further comprising a user interface coupled to said preload adjustment controller, wherein said preset range is input into said preload adjustment controller via said user interface.

26. The dual stage vehicle pedal accelerator assembly of claim 18, further comprising a user interface coupled to said stage transition controller, wherein selection of said third control signal or said fourth control signal is input into said stage transition controller via said user interface.

27. The dual stage vehicle pedal accelerator assembly of claim 8, wherein said second spring is comprised of a second compression coil spring.

28. The dual stage vehicle pedal accelerator assembly of claim 10, wherein during accelerator pedal motion within said first pedal stroke stage said first spring compression member moves and said second spring compression member remains stationary, and wherein during accelerator pedal motion within said second pedal stroke stage said first spring compression member moves and said second spring compression member moves.

* * * * *